US006482091B1

United States Patent
Kobayashi et al.

(10) Patent No.: US 6,482,091 B1
(45) Date of Patent: Nov. 19, 2002

(54) ENTERTAINMENT SYSTEM, ENTERTAINMENT APPARATUS, RECORDING MEDIUM, AND PROGRAM

(75) Inventors: Takaki Kobayashi, Hokkaido (JP); Eiji Uriya, Hokkaido (JP); Akira Koike, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/605,907

(22) Filed: Jun. 28, 2000

(30) Foreign Application Priority Data

Jul. 2, 1999 (JP) .......................... 11-189704

(51) Int. Cl.[7] .................... A63F 13/00; G09B 19/00
(52) U.S. Cl. ...................... 463/36; 463/37; 463/38; 463/43; 463/1; 434/127
(58) Field of Search ................... 463/37, 38, 43; 434/127

(56) References Cited

U.S. PATENT DOCUMENTS

| 4,807,169 A | 2/1989 | Overbeck | 364/715.01 |
|---|---|---|---|
| 5,513,991 A | 5/1996 | Reynolds et al. | 439/81 |
| 5,832,446 A | 11/1998 | Neuhaus | 705/1 |
| 6,379,253 B1 * | 4/2002 | Nishioka | 273/148 B |

FOREIGN PATENT DOCUMENTS

| JP | 6296759 A | * 10/1994 |
|---|---|---|
| JP | 262748 A | * 9/2000 |

OTHER PUBLICATIONS

Cooking Fighter Hao, Feb. 19, 1998 <www.jvgfanatic.com/coolnunusual/pages/13CookingFighter.html>.*
Iron Chef Compendium <www.ironchef.com/ironshightings.shtml>.*
Import Madness: Foodality, Online, Feb. 19, 1998 <URL:psx.ign.com/news.r330.html>.

* cited by examiner

Primary Examiner—Valencia Martin-Wallace
Assistant Examiner—Alex F. R. P. Rada, II
(74) Attorney, Agent, or Firm—Fitch, Even, Tabin, & Flannery

(57) ABSTRACT

An entertainment system comprises story developing means for allowing a player to a virtually experience a cocking operation in a kitchen of a restaurant registered with a restaurant information table from opening time to closing time of the restaurant, three-minute cooking processing means for allowing a player to virtually experience a cooking operation in a kitchen of a restaurant registered with the restaurant information table for a predetermined time period (for example, three minutes), and competition processing means for allowing a player to virtually experience a cooking operation in a kitchen of a restaurant registered with the restaurant information table, while playing a match game with a plurality of other players.

20 Claims, 34 Drawing Sheets

FIG. 18

RESTAURANT INFORMATION TABLE

| |
|---|
| FOOD ITEM (CHINESE NOODLE) |
| FOOD ITEM (BEER) |
| 'FFFF' |
| 'FFFF' |
| 'FFFF' |
| ACCOMMODATION CAPACITY NUMBER |
| APPEARANCE LEVEL OF OBSTRUCTIVE CHARACTERS |
| FOOD ITEM (HAMBURGER) |
| FOOD ITEM (JUICE) |
| FOOD ITEM (FRENCH FRIES) |
| 'FFFF' |
| 'FFFF' |
| ACCOMMODATION CAPACITY NUMBER |
| APPEARANCE LEVEL OF OBSTRUCTIVE CHARACTERS |

RECORD 0 (i=0): rows 1–7
RECORD 1 (i=1): rows 8–14

FIG. 19A  FOOD ITEM INFORMATION TABLE (CHINESE NOODLE)

| FOOD ITEM (CHINESE NOODLE) | |
|---|---|
| 0 | PROGRAM NUMBER OF CUTTING PROCESS |
| 1 | PROGRAM NUMBER OF BOILING PROCESS |
| 1 | PROGRAM NUMBER OF SEASONING PROCESS |

FIG. 19B  FOOD ITEM INFORMATION TABLE (BEER)

| FOOD ITEM (BEER) | |
|---|---|
| 0 | PROGRAM NUMBER OF POURING PROCESS |

FIG. 19C  FOOD ITEM INFORMATION TABLE (HAMBURGER)

| FOOD ITEM (HAMBURGER) | |
|---|---|
| 0 | PROGRAM NUMBER OF CUTTING PROCESS |
| 0 | PROGRAM NUMBER OF AIR-RELEASING PROCESS |
| 1 | PROGRAM NUMBER OF GRILLING PROCESS |
| 1 | PROGRAM NUMBER OF ADDING KETCHUP PROCESS |

FIG. 26

| | | SPECIAL GUEST FLAG (1/0=SPECIAL GUEST/ORDINARY GUEST) | | | | | |
|---|---|---|---|---|---|---|---|
| RECORD 1 | FOOD ITEM | STATUS | EVALUATION | EVALUATION | ... | OBSTRUCTION COEFFICIENT | ORDER 1 |
| RECORD 2 | FOOD ITEM | STATUS | EVALUATION | EVALUATION | | OBSTRUCTION COEFFICIENT | ORDER 2 |
| RECORD 3 | FOOD ITEM | STATUS | EVALUATION | EVALUATION | | OBSTRUCTION COEFFICIENT | ORDER 3 |
| ... | | | | | | | ... |

ENTERTAINMENT SYSTEM, ENTERTAINMENT APPARATUS, RECORDING MEDIUM, AND PROGRAM

BACKGROUND OF THE INVENTION

1. Field of the Invention

The present invention relates to an entertainment system for progressing a cooking scenario on a display monitor in accordance with an instruction from a manual controller, an entertainment apparatus for executing various programs, a recording medium for storing programs and data for progressing a cooking scenario, and a program itself.

2. Description of the Related Art

Some entertainment systems having entertainment apparatus which include video game machines execute a game according to a game program which is read from a recording medium such as a CD-ROM or the like under the control of a manual controller while game images are being displayed on the display screen of a television receiver based on data read from the recording medium.

The entertainment apparatus and the manual controller are usually connected to each other by serial interfaces. When a clock signal is sent from the entertainment apparatus to the manual controller, the manual controller sends key switch information corresponding to manual input actions of the user in synchronism with the clock signal.

Recently, there has been developed and used a manual controller incorporating a vibration generating mechanism for imparting vibrations to the user in response to a request from an external drive, for example, the entertainment apparatus. While a game is in progress on the entertainment apparatus, various vibrations corresponding to manual input actions of the user are generated and imparted to the user.

In such circumstances, various virtual games for allowing a user to virtually experience something real, that is, driving of trains, controlling of airplanes or the like are currently available on the market. However, in these games, manipulating method of the manual controller for driving trains or controlling airplanes tends to be quite simple. Specifically, the user is merely required to adjust the timing of a fixed manipulation (for example, pressing of control buttons in a predetermined order) depending on the change of stages. Therefore, since the manipulation of the manual controller is not challenging, the user tends to acquire the manipulation skill easily and get bored soon with these games. Further, since the stages of the games do not have any substantial variations, the games tend to be rather monotonous.

Therefore, a virtual cooking game for allowing a player to virtually experience a cooking operation is proposed by the inventors of the present application. In this game, the user can move various virtual objects by various manipulating techniques in various stages. Further, events for changing the development of a scenario can be abruptly introduced in the cooking game. Accordingly, the user never gets bored with playing the cooking game.

SUMMARY OF THE INVENTION

It is therefore an object of the present invention to provide an entertainment system, an entertainment apparatus, a recording medium, and a program which allow a user to virtually experience a cooking operation easily and pleasantly, wherein appearance and/or taste of food is greatly affected by slight power adjustment by fingers or slight heat adjustment.

Another object of the present invention is to provide an entertainment system, an entertainment apparatus, a recording medium, and a program which allow a user to compete the speed for smoothly serving delicious food for many guests in the restaurant so as to provide an amusing and interesting game which has not been available before.

An entertainment system according to the present invention comprises:

an entertainment apparatus for executing various programs;

at least one manual controller for inputting a manual control request of a user to the entertainment apparatus as an instruction;

a display monitor for displaying images outputted by the entertainment apparatus; and scenario progressing means for progressing a cooking scenario displayed on the display monitor in accordance with the instruction from the manual controller.

Further, an entertainment apparatus according to the present invention is connectable to at least one manual controller for outputting a manual control request of a user to the entertainment apparatus as an instruction, and to a display monitor for displaying images outputted by the entertainment apparatus, the entertainment apparatus comprising:

scenario progressing means for progressing a cooking scenario displayed on the display monitor in accordance with the instruction from the manual controller.

Further, a recording medium according to the present invention stores a program and data for use of an entertainment system, the entertainment system comprising:

an entertainment apparatus for executing various programs;

at least one manual controller for inputting a manual control request of a user to the entertainment apparatus as an instruction; and a display monitor for displaying images outputted by the entertainment apparatus;

wherein the program comprises scenario progressing step for progressing a cooking scenario displayed on the display monitor in accordance with the instruction from the manual controller.

Further, a program according to the present invention is readable and executable by a computer, the program being for use of an entertainment system comprising:

an entertainment apparatus for executing various programs;

at least one manual controller for inputting a manual control request of a user to the entertainment apparatus as an instruction; and a display monitor for displaying images outputted by the entertainment apparatus;

wherein the program comprises scenario progressing step for progressing a cooking scenario displayed on the display monitor in accordance with the instruction from the manual controller.

According to the present invention, a user can virtually experience a cooking operation easily and pleasantly, wherein appearance and/or taste of food is greatly affected by slight power adjustment by fingers or slight heat adjustment.

The scenario progressing means (step) may comprises cooking guidance processing means (step) for providing an introduction of a food item registered with an information table. Accordingly, it is convenient when the user forgets the cooking method (the way of manipulating the manual controller), or when the user tries to play the game for the first time.

Further, the scenario progressing means (step) may comprises cooking trial processing means (step) for allowing the user to perform a trial for cooking a food item registered with the information table. Thus, the user can virtually experience the cooking method (the way of manipulating the manual controller) for respective food items. Accordingly, it is possible for the user to smoothly memorize the cooking method.

Further, the scenario progressing means (step) may comprises first virtual experience processing means (step) for allowing the user to virtually experience a cooking operation in a kitchen of a restaurant registered with the information table from opening time to closing time of the restaurant. Thus, the user can enjoy a game for competing the speed for smoothly serving delicious food for many guests in the restaurant. Accordingly, it is possible to provide an amusing and interesting game which has not been available before.

Further, the scenario progressing means (step) may comprises second virtual experience processing means (step) for allowing the user to virtually experience a cooking operation in a kitchen of a restaurant registered with the information table for a predetermined time period. Thus, the user can virtually enjoy a game for competing the speed of raising the rank of the restaurant in a short time. Accordingly, it is possible to provide a game which is suitable for the user who wants to play the game only for a short period of time.

Further, the scenario progressing means (step) may comprises third virtual experience processing means (step) for allowing the user to virtually experience a cooking operation in a kitchen of a restaurant registered with the information table, while playing a match game with a plurality of other users. Thus, the user can virtually experience the cooking experience with the user's friends. Accordingly, a further amusing aspect is added to the game.

Further, the scenario progressing means (step) may comprises cooking process progressing means (step) for progressing a cooking process based on manual control data inputted from the manual controller.

Further, the scenario progressing means (step) may comprises evaluation processing means (step) for evaluating status of cooking progress.

Further, the scenario progressing means (step) may comprises progress obstructing means (step) for obstructing cooking progress. Thus, the smoothly progressing cooking process can be abruptly obstructed by an obstructive character. Accordingly, the development of the game becomes unpredictable, thereby adding a further amusing aspect to the game.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 18 is a view showing contents of a restaurant information table;

FIGS. 19A through 19C are views showing contents of food item information tables;

FIG. 26 is a view showing contents of an order file;

DESCRIPTION OF THE PREFERRED EMBODIMENTS

Embodiments of the entertainment system and recording medium according to the present invention will be described with reference to FIGS. 1 through 34.

Figure 1:
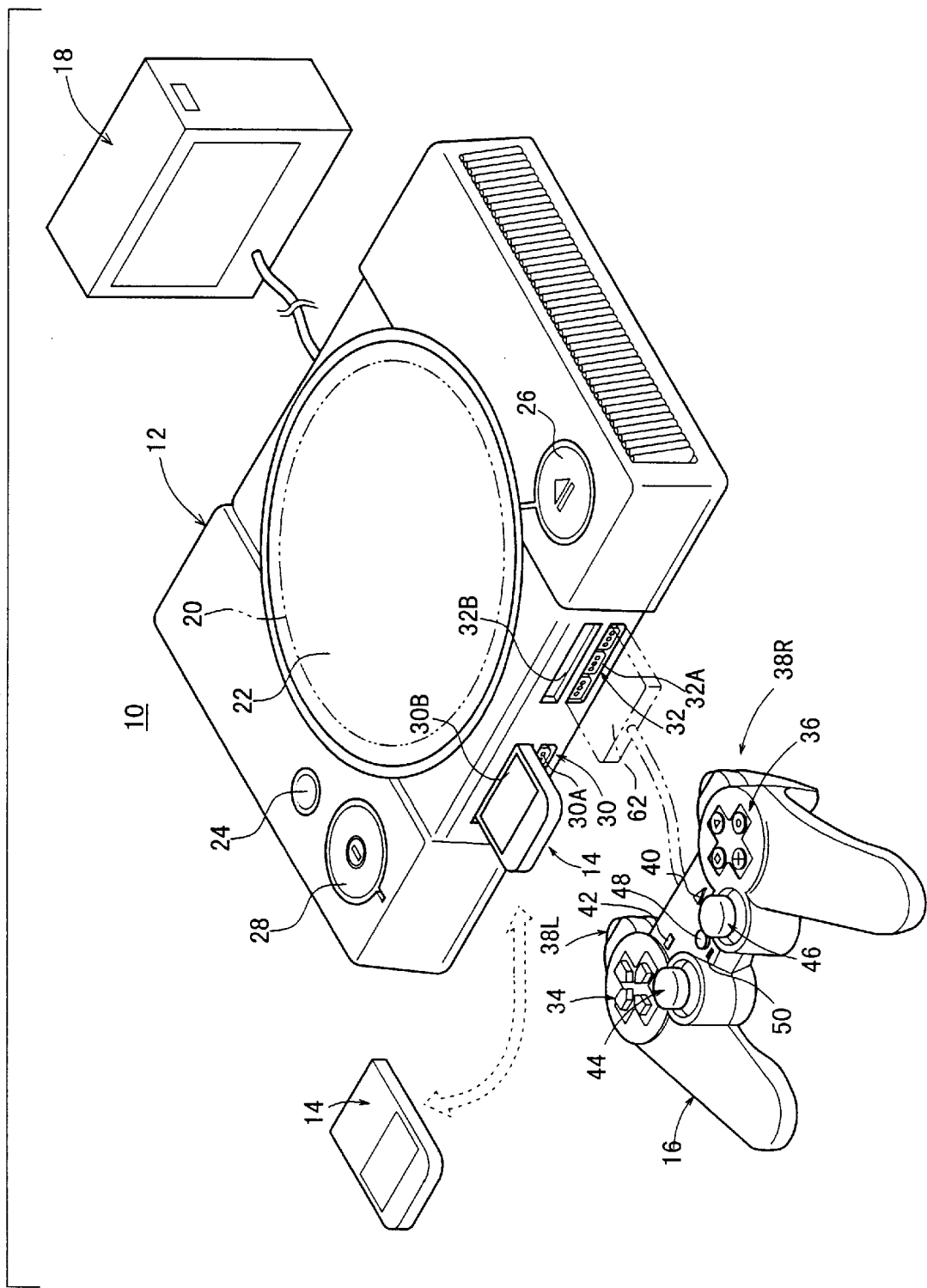
FIG. 1 is a perspective view of an entertainment system incorporating an entertainment apparatus according to the present invention.

As shown in FIG. 1, an entertainment system 10 basically comprises an entertainment apparatus 12 for executing various programs, a memory card 14 detachably connected to the entertainment apparatus 12, a manual controller 16 detachably connected to the entertainment apparatus 12 by a connector 62, and a display monitor 18 such as a television receiver which is supplied with video and audio output signals from the entertainment apparatus 12.

The entertainment apparatus 12 reads a program recorded in a mass storage medium such as an optical disk 20 such as a CD-ROM or the like, and executes a game, for example, based on the program depending on commands supplied from the user, e.g., the game player, via the manual controller 16. The execution of the game mainly represents controlling the progress of the game by controlling the display of images and the generation of sounds on the display monitor 18 based on manual input actions entered from the manual controller 16 via the connector 62.

The entertainment apparatus 12 has a substantially flat casing in the shape of a rectangular parallelepiped which houses a disk loading unit 22 disposed centrally for loading an optical disk 20 for supplying an application program and data for a video game or the like. The casing supports a reset switch 24 for resetting a program which is being presently executed, a disk control switch 26 for controlling the loading of the optical disk 20, a power supply switch 28, and two slots 30, 32.

The entertainment apparatus 12 may be supplied with the application program via a communication link, rather than being supplied from the optical disk as the recording medium.

The slots 30, 32 have respective upper slot units 30B, 32B and respective lower slots units 30A, 32A. Two manual controllers 16 may be connected respectively to the lower slots units 30A, 32A, and memory cards 14 for storing flags indicative of interim game data may be connected respectively to the upper slots units 30B, 32B. The slots 30, 32 (the upper slot units 30B, 32B and the lower slots units 30A, 32A) are asymmetrically shaped to prevent the connectors 62 and the memory cards 14 from being inserted in the wrong direction.

The manual controller 16 has first and second control pads 34, 36, an L (Left) button 38L, an R (Right) button 38R, a start button 40, and a selection button 42. The manual controller 16 also has swivel control members 44, 46 for making analog control actions, a mode selection switch 48 for selecting control modes of the swivel control members 44, 46, and an indicator 50 for indicating a selected control mode. The indicator 50 comprises a light-emitting element such as a light-emitting diode or the like.

Figure 2:
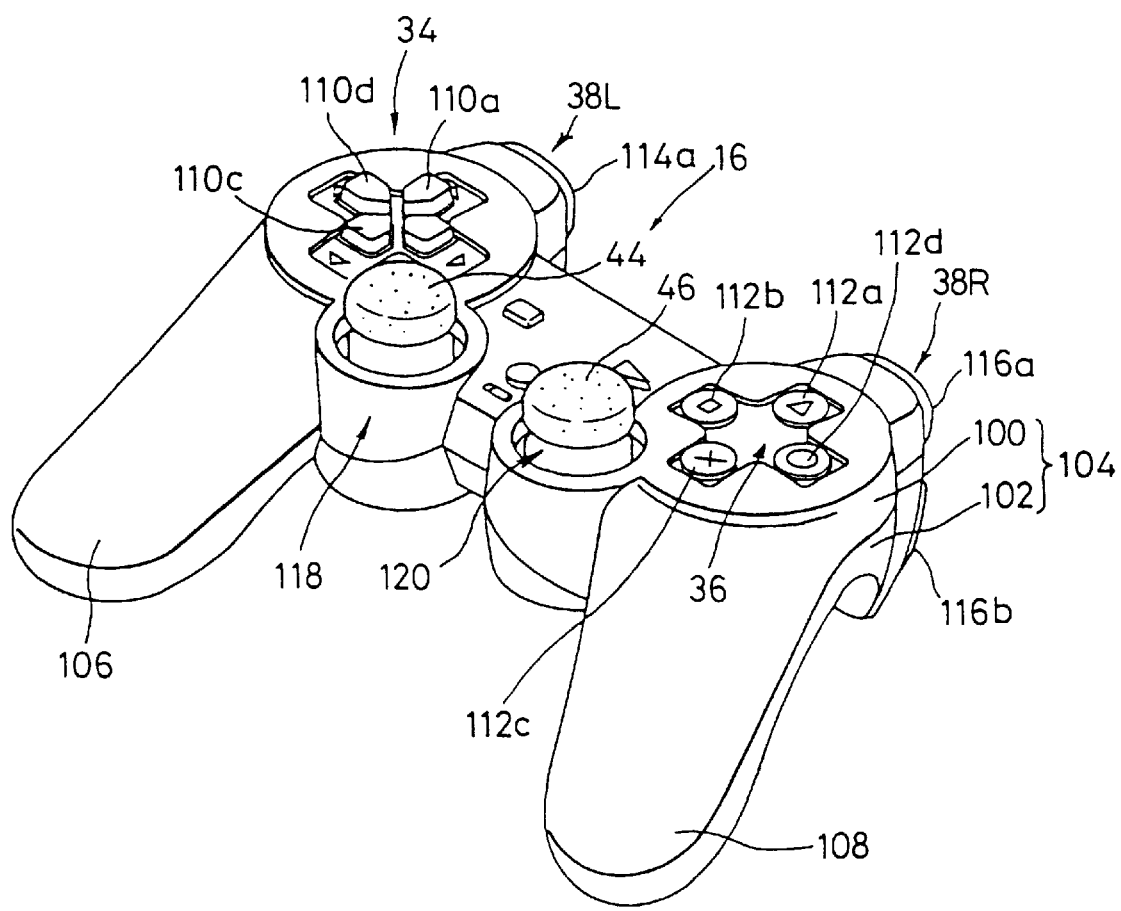
FIG. 2 is a perspective view of a manual controller.

As shown in FIG. 2, the manual controller 16 has a housing 104 comprising an upper member 100 and a lower member 102 which are mated and joined to each other by fasteners such as screws.

Figure 3:
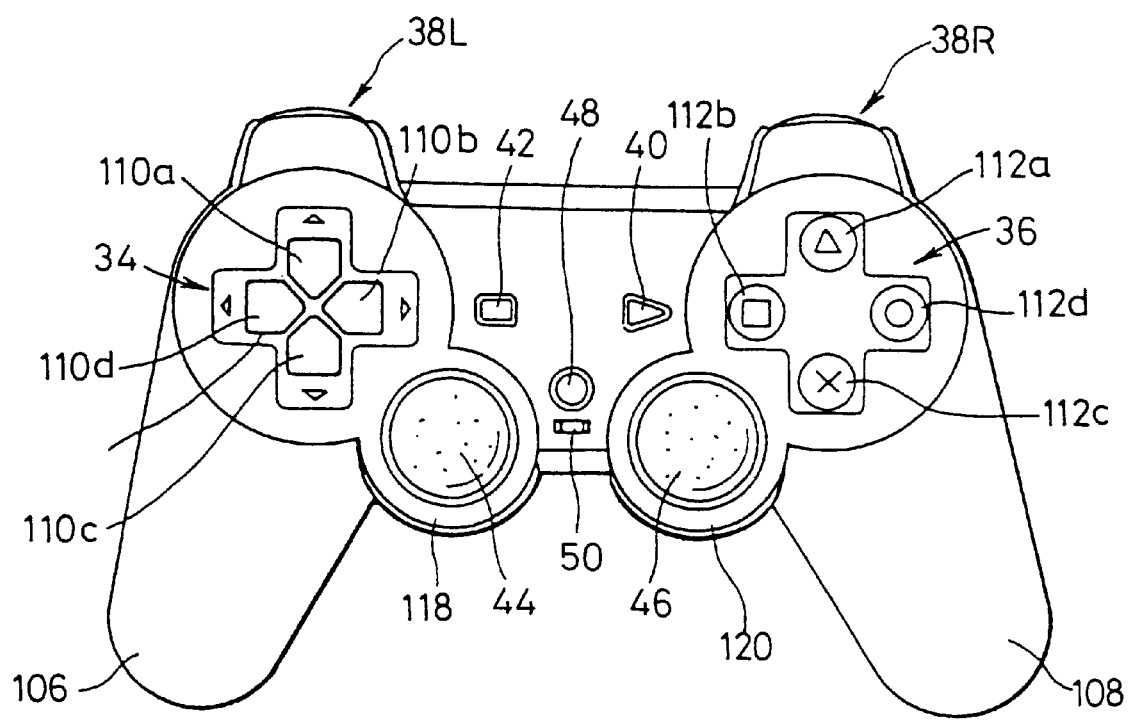
FIG. 3 is a plan view of the manual controller.

As shown in FIGS. 2 and 3, a pair of first and second grips 106, 108 projects from one side of respective opposite ends of the housing 104. The first and second grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 3, the first and second grips 106, 108 are progressively spaced away from each other toward their distal ends. To allow the game player to grip the first and second grips 106, 108 comfortably for a long period of time, the first and second grips 106, 108 are tapered from their joint with the housing 104 toward their distal ends, and have arcuate outer peripheral surfaces and arcuate distal end surfaces.

As shown in FIGS. 2 and 3, the first control pad 34 is disposed on one end of the housing 104 and comprises first through fourth pressable control members 110a, 110b, 110c, 10d. The first through fourth pressable control members 110a, 110b, 110c, 110d project on an upper surface of the housing 104 and are arranged in a crisscross pattern.

The first control pad 34 includes switch elements as signal input elements associated respectively with the first through fourth pressable control members 110a, 110b, 110c, 110d. The first control pad 34 functions as a directional controller for controlling the direction of movement of a displayed game character, for example. When the game player selectively presses the first through fourth pressable control members 110a, 110b, 110c, 110d to turn on or off the switch elements associated respectively with the first through fourth pressable control members 110a, 110b, 110c, 110d, the displayed game character moves in the direction corresponding to the pressed one of the first through fourth pressable control members 110a, 110b, 110c, 110d.

As shown in FIGS. 2 and 3, the second control pad 36 is disposed on the other end of the housing 104 and comprises first through fourth pressable control members 112a, 112b, 112c, 112d. The first through fourth pressable control members 112a, 112b, 112c, 112d project on the upper surface of the housing 104 and are arranged in a crisscross pattern.

The first through fourth pressable control members 112a, 112b, 112c, 112d are constructed as independent members, and associated with respective switch elements disposed in the second control pad 36.

The second control pad 36 serves as a function setting/performing unit for setting functions for a displayed game character assigned to the pressable control members 112a–112d or performing functions of a displayed game character when the switch elements associated with the pressable control members 112a–112d are turned on.

Figure 4:
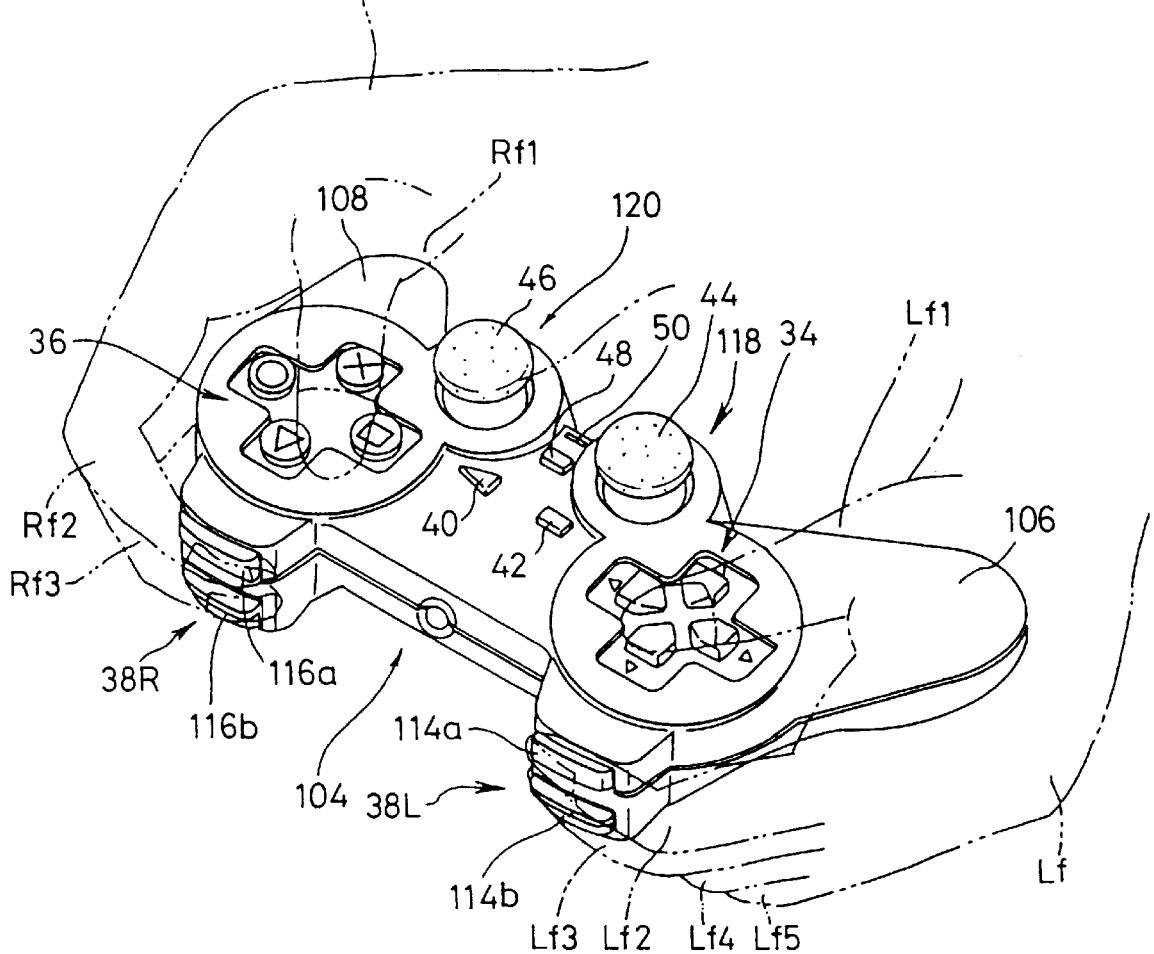
FIG. 4 is a perspective view showing the manner in which the manual controller is used.

The L button 38L and the R button 38R are disposed on a side of the housing 104 remote from the first and second grips 106, 108 and positioned respectively at the opposite ends of the housing 104. As shown in FIG. 4, the L button 38L and the R button 38R have respective first and second pressable control members 114a, 114b and 116a, 116b and respective switch elements associated respectively with the pressable control members 114a, 114b and 116a, 116b.

The L button 38L and the R button 38R serve as respective function setting/performing units for setting functions for a displayed game character assigned to the pressable control members 114a, 114b and 116a, 116b or performing functions of a displayed game character when the switch elements associated with the pressable control members 114a, 114b and 116a, 116b are turned on.

As shown in FIGS. 2 and 3, the manual controller 16 also has first and second analog control pads 118, 120 disposed respectively at confronting corners defined between the housing 104 and the proximal ends of the first and second grips 106, 108 which are joined to the housing 104.

The first and second analog control pads 118, 120 have the respective swivel control members 44, 46 rotatable 360° about control shafts thereof, and respective signal input elements such as variable resistors or the like which are operable by the respective swivel control members 44, 46. Specifically, the swivel control members 44, 46 are mounted on tip ends of the control shafts that are normally urged to return to their neutral positions by biasing members, and can be rotated 360° about the axes of the control shafts.

The first and second analog control pads 118, 120 can move a displayed game character while rotating the same or while changing its speed, and can make an analog-like action such as to change the form of a displayed character, when the game player rotates the swivel control members 44, 46. Therefore, the first and second analog control pads 118, 120 are used as a control unit for entering command signals for a displayed character to perform the above movement or action.

When the mode selection switch 48 is pressed, it can select a control mode for allowing a command signal to be inputted from the first and second analog control pads 118, 120 or a control mode for inhibiting a command signal from being inputted from the first and second analog control pads 118, 120.

When the mode selection switch 48 is pressed, it can also select a control mode for allowing a command signal to be inputted from the first and second analog control pads 118, 120 and selecting the function of the first through fourth pressable control members 112a, 112b, 112c, 112d of the second control pad 36 or the function of the pressable control members 114a, 114b and 116a, 116b of the L button 38L and the R button 38R. Depending on the control mode selected by the mode selection switch 48, the mode indicator 50 flickers and changes its indication light.

As shown in FIG. 4, the first and second grips 106, 108 projecting from the housing 104 are gripped respectively by the palms of the hands of the game player. The housing 104 is not required to be supported by fingers, and the manual controller 16 can be held by the hands while at least six out of the ten fingers of the hands can freely be moved.

As shown in FIG. 4, when the first and second grips 106, 108 are gripped respectively by the palms of the hands of the game player, the thumbs Rf1, Lf1 of the right and left hands can extend over the swivel control members 44, 46 of the first and second analog control pads 118, 120, the first through fourth pressable control members 110a–110d of the first control pad 34, and the first through fourth pressable control members 112a–112d of the second control pad 36, and can selectively press the swivel control members 44, 46, the pressable control members 110a–110d, and the pressable control members 112a–112d.

Since the swivel control members 44, 46 of the first and second analog control pads 118, 120 are positioned in confronting relation to the proximal ends of the first and second grips 106, 108 which are joined to the housing 104, when the first and second grips 106, 108 are gripped by the left and right hands, the swivel control members 44, 46 are positioned most closely to the thumbs Rf1, Lf1, respectively. Therefore, the swivel control members 44, 46 can easily be rotated by the thumbs Rf1, Lf1.

As shown in FIG. 4, when the first and second grips 106, 108 are gripped respectively by the palms of the hands of the game player, the index fingers Rf2, Lf2 and middle fingers Rf3, Lf3 of the right and left hands can extend over positions where they can selectively press the first and second pressable control members 114a, 114b and 116a, 116b of the R button 38R and the L button 38L.

Figure 5:
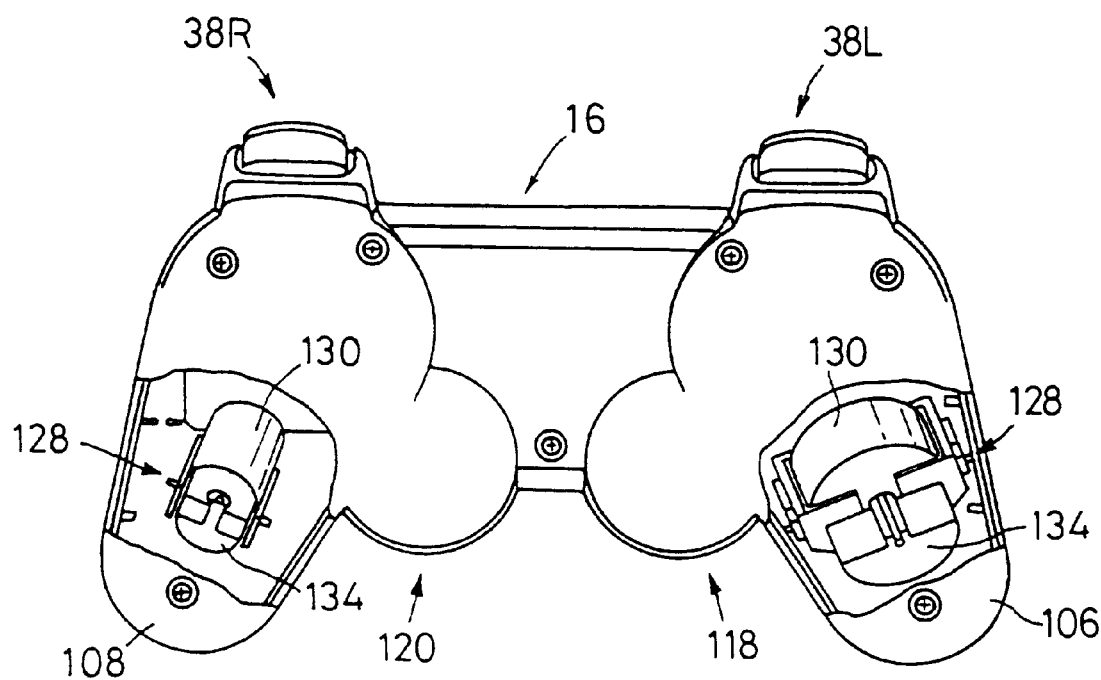
FIG. 5 is a bottom view, partly broken away, of the manual controller, showing vibration imparting mechanisms disposed respectively in first and second grips.

As shown in FIG. 5, the manual controller 16 has a pair of vibration imparting mechanisms 128 for imparting vibrations to the user in order for the user to be able to play a highly realistic game.

As shown in FIG. 5, the vibration imparting mechanisms 128 are positioned near the proximal ends of the first and second grips 106, 108 that are held by the hands and fingers when the manual controller 16 is gripped by the user.

Each of the vibration imparting mechanisms 128 comprises a motor 130 energizable by a vibration generating command supplied from the entertainment apparatus 12, and an eccentric member 134 mounted eccentrically on the drive shaft of the motor 130.

The eccentric member 134 comprises a weight in the form of a heavy metal member having a semicircular cross-sectional shape. The weight has an off-center hole defined therein in which the drive shaft of the motor 130 is fitted.

When the motor 130 is energized, the drive shaft thereof rotates to cause the eccentric member 134 to rotate in an eccentric motion for thereby producing vibrations, which are imparted to the motor 130. The vibrations of the motor 130 are then transmitted to the first grip 106 and the second grip 108, from which the vibrations are applied to the hand and fingers that grip the first grip 106 and the second grip 108.

The vibration imparting mechanisms 128 disposed respectively in the first and second grips 106, 108 are arranged to impart vibrations in different modes. For example, the motors 130 of the vibration imparting mechanisms 128 have different sizes such that when the motors 130 are energized at a constant voltage, their drive shafts rotate at different speeds to rotate the eccentric members 134 at different speeds for thereby generating vibrations at different frequencies.

In order to energize the motors 130 to vibrate the manual controller 16 in its entirety, a bidirectional communication function needs to be provided between the manual controller 16 and the entertainment apparatus 12. This bidirectional communication function will be described later on.

Circuit arrangements of the entertainment apparatus 12 and the manual controller 16 will be described below with reference to FIGS. 6 and 7.

Figure 6:
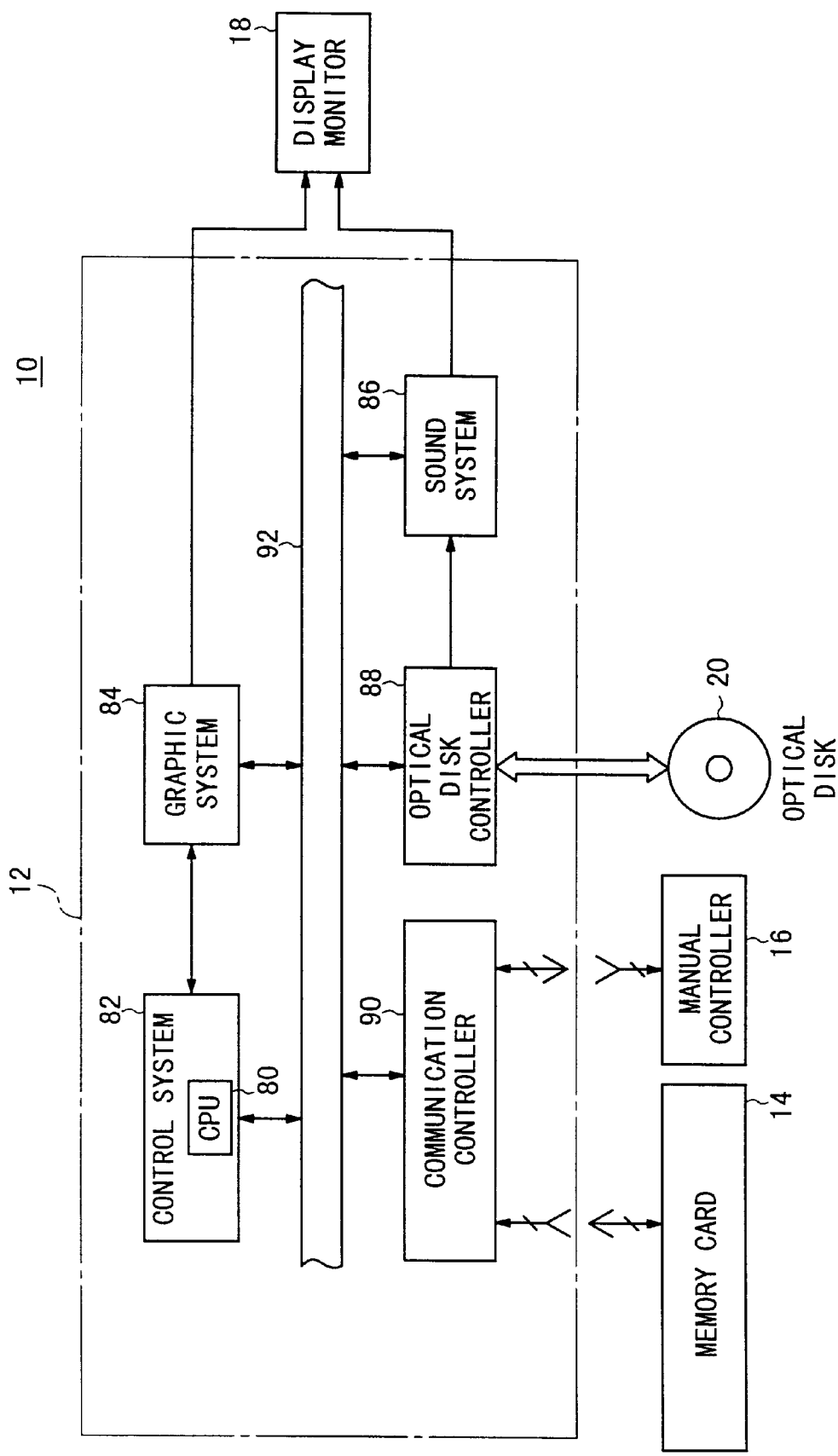
FIG. 6 is a block diagram of a circuit arrangement of the entertainment apparatus.

As shown in FIG. 6, the entertainment apparatus 12 comprises a control system 82 including a central processing unit (CPU) 80 and peripheral devices thereof, a graphic system 84 including a frame buffer (not illustrated) and a graphic processing unit (GPU) for rendering image data in the frame buffer, a sound system 86 including a sound processing unit (SPU) for generating music sounds and sound effects, an optical disk controller 88 for controlling the readout of the optical disk 20 in which application programs and data are stored, a communication controller 90 for controlling the inputting of data into and outputting of data from the manual controller 16 and the memory card 14, and a system bus 92 to which the control system 82, the graphic system 84, the sound system 86, the optical disk controller 88, and the communication controller 90 are connected.

Video and audio signals generated by and outputted from the graphic system 84 and the sound system 86 are supplied to the display monitor 18 to display images on the display screen of the display monitor 18 and reproduce sounds from the speakers of the display monitor 18.

Figure 7:
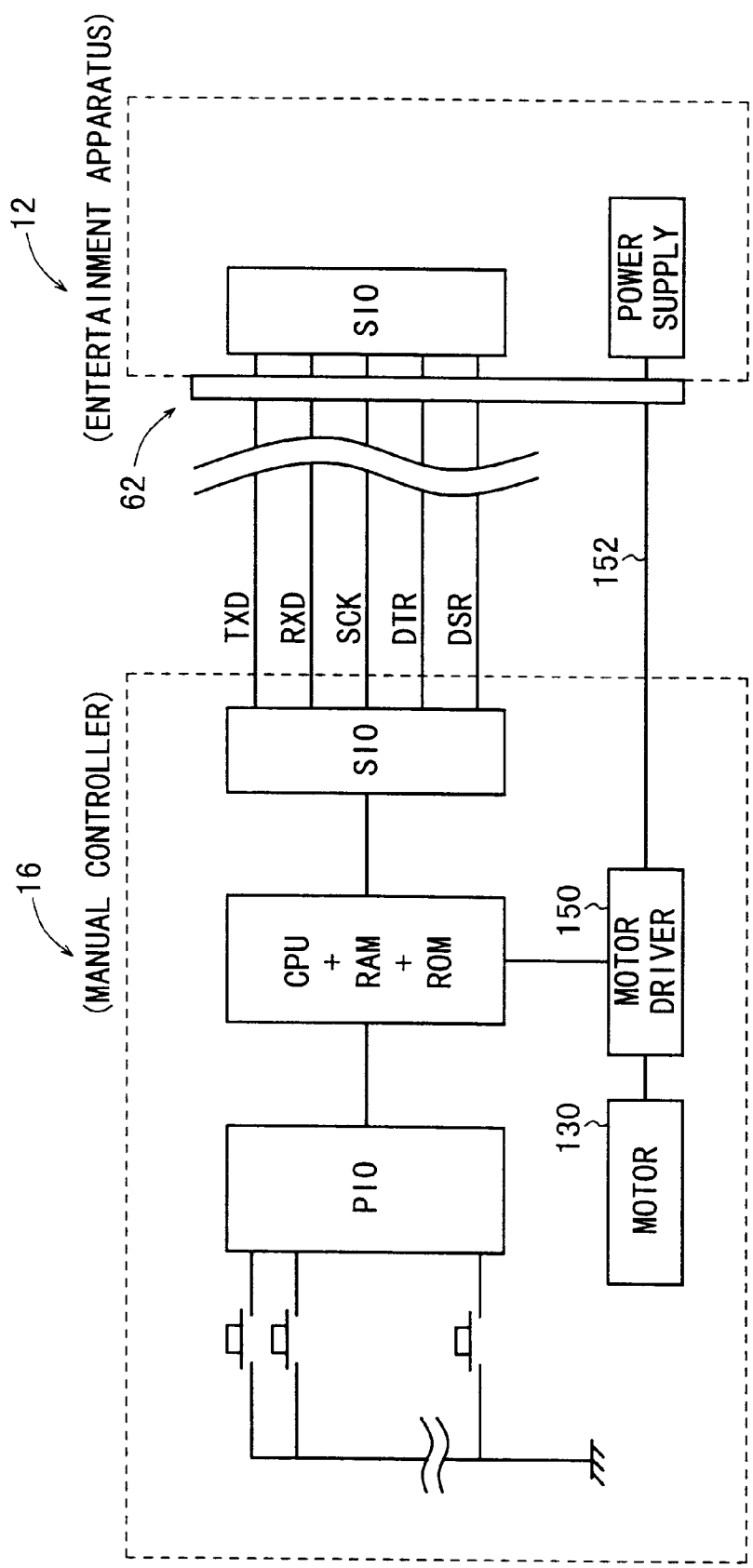
FIG. 7 is a block diagram of components for carrying out bidirectional serial communications between the manual controller and the entertainment apparatus.

As shown in FIG. 7, the bidirectional communication function between the entertainment apparatus 12 and the manual controller 16 can be performed when the connector 62 capable of performing bidirectional serial communications with the manual controller 16 is connected to the entertainment apparatus 12.

A system in the manual controller 16 for performing the bidirectional communication function comprises a serial I/O interface SIO for performing serial communication with the entertainment apparatus 12, a parallel I/O interface PIO for entering control data from a plurality of control buttons, a one-chip microcomputer comprising a CPU, a RAM, and a ROM, and a motor driver 150 for energizing the motors 130 of the vibration imparting mechanisms 128. Each of the motors 130 is energized by a voltage and a current supplied from the motor driver 150.

A system in the entertainment apparatus 12 for performing the bidirectional communication function comprises a serial I/O interface SIO for performing serial communication with the manual controller 16. When the connector 62 is connected to the serial I/O interface SIO of the entertainment apparatus 12, the serial I/O interface SIO of the entertainment apparatus 12 is connected to the serial I/O interface SIO of the manual controller 16 via the connector 62 for performing bidirectional communications between the manual controller 16 and the entertainment apparatus 12. Other structural details of the entertainment apparatus 12 are omitted from illustration in FIG. 7.

Signal and control lines for bidirectional serial communications include a data transfer signal line TXD (Transmit X' for Data) for sending data from the entertainment apparatus 12 to the manual controller 16, a data transfer signal line RXD (Received X' for Data) for sending data from the manual controller 16 to the entertainment apparatus 12, a serial synchronous clock signal line SCK (Serial Clock) for extracting data from the data transfer signal lines TXD, RXD, a control line DTR (Data Terminal Ready) for establishing and cutting off communication with the manual controller 16 as a terminal, and a flow control line DSR (Data Set Ready) for transferring a large amount of data.

The signal and control lines for bidirectional serial communication are accommodated in a cable. As shown in FIG. 7, this cable further includes a power line 152 extending from a power supply in the entertainment apparatus 12 and connected to the motor drivers 150 in the manual controller 16 for supplying electric energy to energize the motors 130.

A process of bidirectional serial communication between the manual controller 16 and the entertainment apparatus 12 will be described below. In order for the entertainment apparatus 12 to communicate with the manual controller 16 to read control data of the control buttons (button information) of the first and second control pads 34, 36 and the L button 38L and the R button 38R, the entertainment apparatus 12 first outputs selection data to the control line DTR. As a result, the manual controller 16 confirms that it is selected by the control line DTR, and then waits for a signal from the signal line TXD. Then, the entertainment apparatus 12 outputs an identification code indicative of the manual controller 16 to the data transfer signal line TXD. The manual controller 16 receives the identification code from the signal line TXD.

When the manual controller 16 recognizes the identification code, the manual controller 16 starts communicating with the entertainment apparatus 12. The entertainment apparatus 12 sends control data via the data transfer signal line TXD to the manual controller 16, which sends control data produced by a control button via the data transfer signal line RXD to the entertainment apparatus 12. In this manner, the entertainment apparatus 12 and the manual controller 16 perform bidirectional serial communications. The bidirectional serial communications will be finished when the entertainment apparatus 12 outputs selection stop data via the control line DTR.

With the bidirectional serial communication function, the manual controller 16 can send mainly control data of control buttons to the entertainment apparatus 12, and the entertainment apparatus 12 can send a vibration generating command for energizing the motors 130 of the vibration imparting mechanisms 128 via the data transfer signal line TXD to the manual controller 16.

The vibration generating command for energizing the motors 130 has been established in advance in a CD-ROM set in the entertainment apparatus 12. Depending on the motion target for the user who plays the game, the entertainment apparatus 12 sends the vibration generating command to the manual controller 16 to feed back vibrations for a certain period of time to the manual controller 16.

A characteristic function of the entertainment system 10 according to the present embodiment will be described below with reference to FIGS. 21 through 34.

The characteristic function of the entertainment system is to progress a cooking scenario displayed on the display monitor 18 according to instructions from the manual controller 16.

Objects related to cooking are displayed on the display monitor 18. The objects move on the display monitor 18 according to analog input signals from the manual controller 16, specifically, analog input values generated by manually controlling the left and right swivel control members 44 and 46. Alternatively, the analog input values can be generated by controlling other control members.

Figure 8:
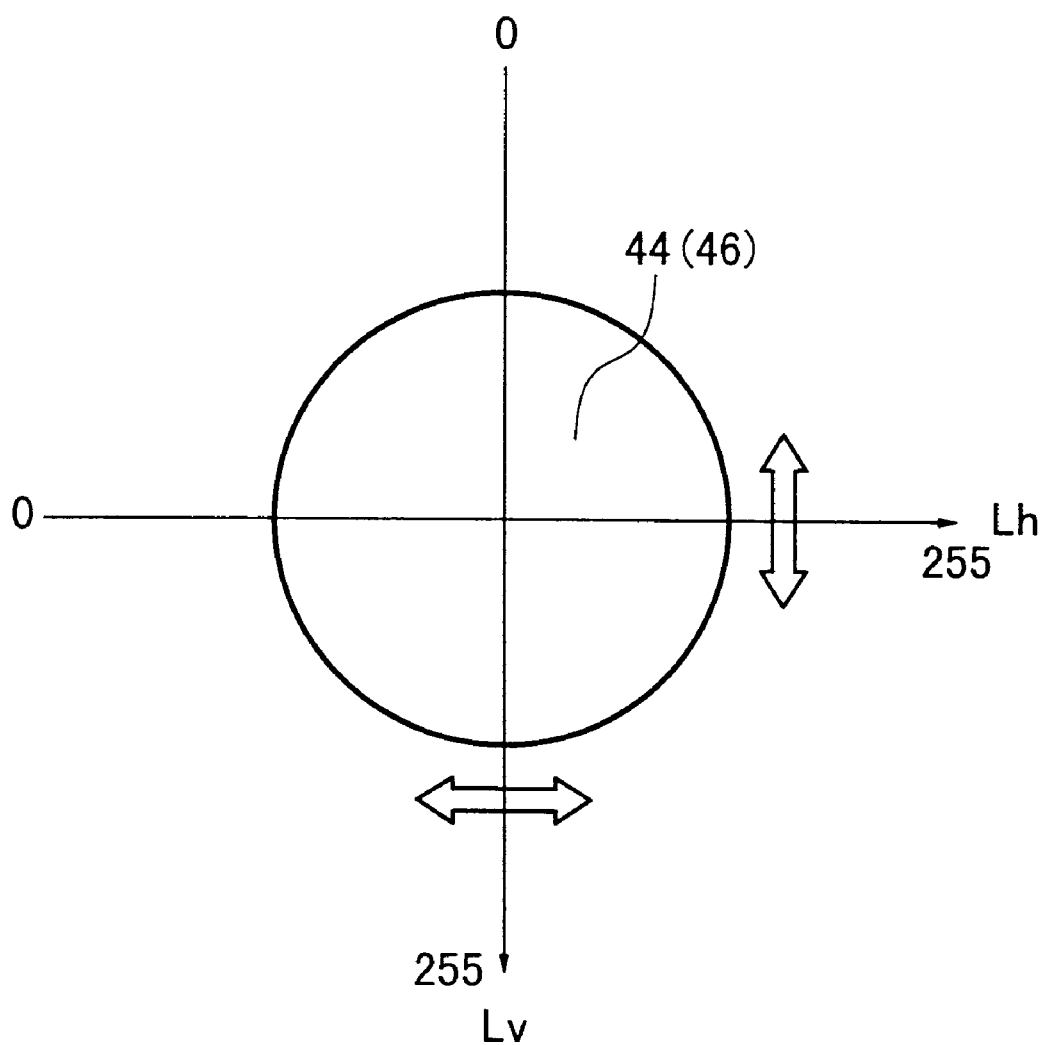
FIG. 8 is a view showing a relationship between a vertical value and left or right swivel control member, and a relationship between a horizontal value and the left or right swivel control member.

The analog input values generated by controlling the left and right swivel control members 44 and 46 are determined by the positions of the left and right swivel control members 44 and 46. In FIG. 8, the relationship between the positions of the left swivel control member 44 or right swivel control member 46 and the analog input value is shown. It is to be understood that one analog input value comprises two directional values, that is, the value in the vertical direction (vertical value Lv), and the value in the horizontal direction (horizontal value Lh) depending on the vertical position and the horizontal position of the swivel control member. The vertical value Lv is in the range of "0" through "255" from the upper end position to the lower end position. Similarly, the horizontal value Lh is in the range of "0" through "255" from the left end position to the right end position. Further, the degree of leaning L can be calculated by the following expression.

$$L=\sqrt{0}(Lv^2+Lh^2)$$

Figure 9:
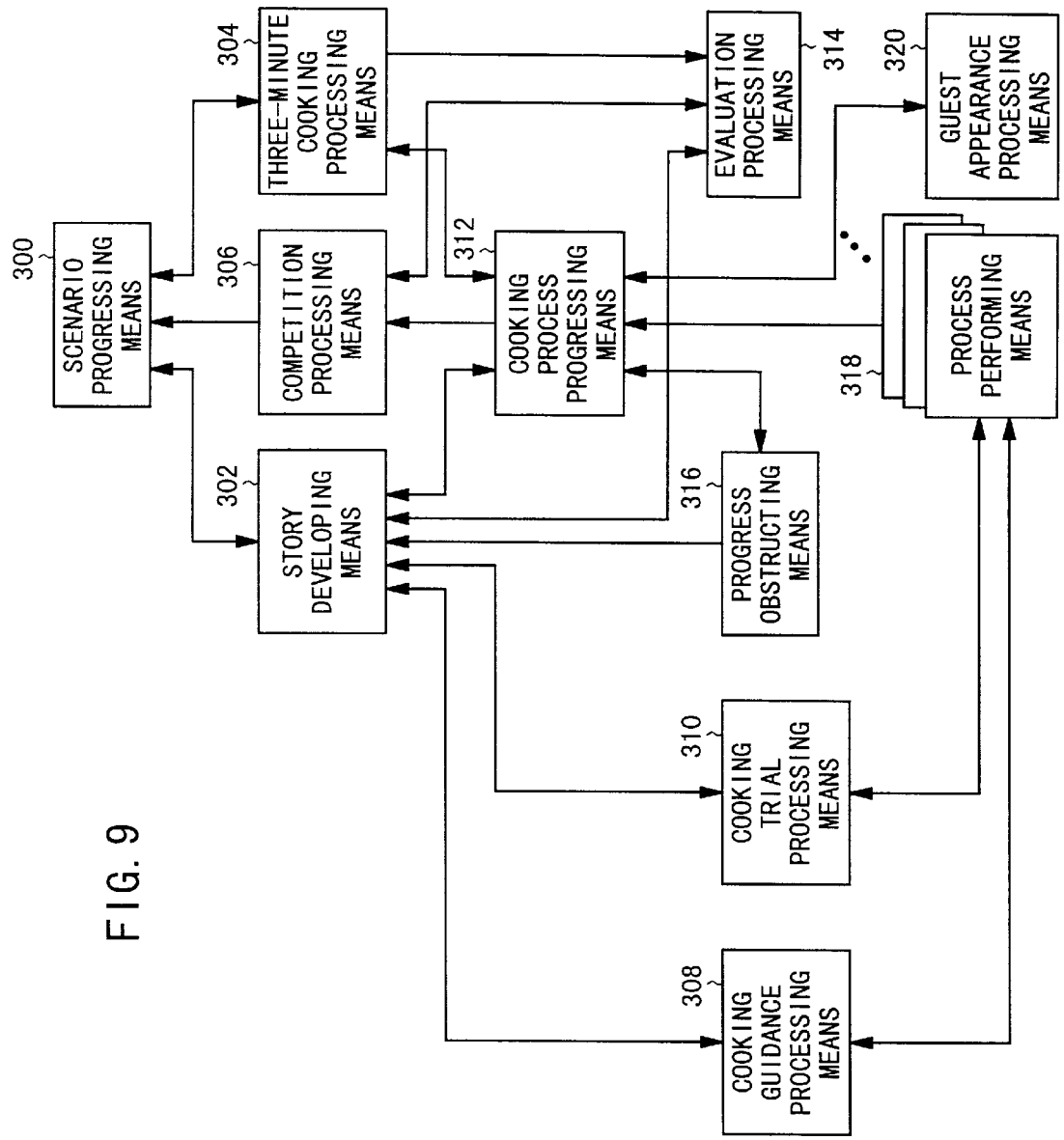
FIG. 9 is a functional block diagram showing a system of scenario progressing means according to an embodiment of the present invention.

The function to progress the cooking scenario displayed on the display monitor 18 according to the instructions from the manual controller 16 can be carried out by executing scenario progressing means 300 shown in FIG. 9.

Prior to describing the system and operation of the scenario progressing means 300, a cooking game which can be played by executing the scenario progressing means 300 will be described hereinbelow.

A player can select a game mode of the cooking game from a story mode, a three-minute cooking mode, and a competition mode (VS. mode).

In the story mode, a main character performs cooking in different cooking places of various styles, such as a Chinese restaurant, and a hamburger shop. The main character changes the cooking place, that is, goes to the next cooking place (hereinafter also simply referred to as the restaurant) according to the progress of a story (scenario). In each of the cooking places, the main character is required to make delicious foods so that the guests can be content with the foods cooked by the main character. Further, in the story mode, when the rank or reputation of the main character's restaurant is evaluated as the highest rank, the game proceeds to a match game between the main character and the chef of the restaurant. If the main character wins, the main character can go on to the next restaurant.

In the menu screen, if the player selects "New game", the player can start a new game of the story mode from the beginning of a scenario. If the player selects "Continue", the player can continue the saved game from the middle of the scenario based on the data stored on the memory card 14 in the previous game.

In the three-minute cooking mode, a player tries to raise the rank of the player's restaurant as high as possible in three minutes. The rank of the restaurant may be indicated by the number of stars.

In the competition mode, a player enjoys a match game with another player.

Next, the common rules of the story mode, three-minute cooking mode, and the competition mode will be described.

When guests come to a restaurant, they order their foods according to their tastes. In this case, the guests can select foods and/or drinks (hereinafter referred to as food items) from the menu of the restaurant. Types and the number of food items in the menu may differ in the respective restaurants. That is, if only "Chinese noodle" and "beer" are listed on the menu of the restaurant, the guests may order from the two food items.

Then, the player selects one or more food items from various kinds of food items ordered by the guests and starts cooking. If the player successfully makes delicious foods, the guests will leave the restaurant satisfactorily. When a food item is cooked and ready to be served, a score representative of the level or grade of the cooked food item is indicated on the display monitor 18. The maximum score is 10. For example, the food item "beer" can be cooked by a single "pouring" process. That is, the evaluation of the food item is simply determined by the score of "pouring" process. In the case of "Chinese noodle", the cooking processes may include "cutting food materials", "boiling noodle and food materials" and "seasoning". Therefore, the evaluation of the food item "Chinese noodle" is determined by the average score of the three processes.

A restaurant can be evaluated into five ranks, "Excellent", "Good", "Average", "Bad", and "Terrible". If the restaurant is evaluated as "Excellent", the highest rank, the player will be entitled to play the match game with the chef of the restaurant. In the restaurant is evaluated as "Terrible", the lowest rank, the player's restaurant will go bankrupt.

Figure 10:
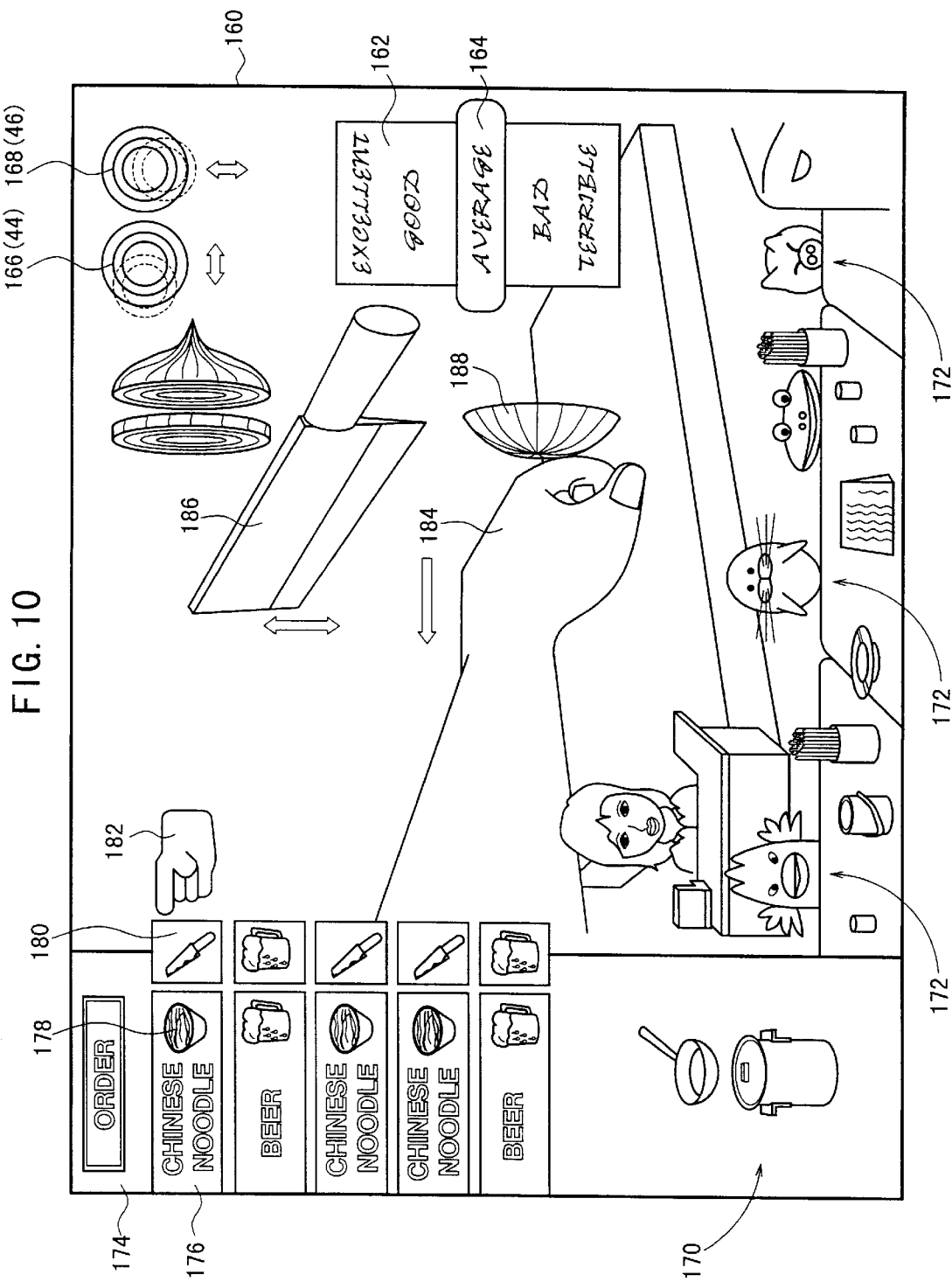
FIG. 10 is a view showing a condition in which a "cutting" process of Chinese noodle is carried out on a monitor screen.

For example, as shown in FIG. 10, the present rank of the restaurant is indicated by a green belt 164 of a vertical meter 162 on the right side of a monitor screen 160 (in FIG. 10, "Average" is indicated").

Further, two circular marks 166 and 168 are indicated on the upper right side of the monitor screen 160. The circular marks 166 and 168 correspond to the left and right swivel control members 44 and 46, respectively. The circular marks 166 and 168 indicate model or tutorial actions for manipulating the swivel control members 44 and 46. For example, actions for cooking food items or getting rid of undesirable obstructive characters are indicated, which will be described later in detail. It is convenient and helpful when a player forgets the way of manipulating the swivel control members 44 and 46, or when a player tries to play the game for the first time.

Icons 170 displayed on the lower left side of the monitor screen 160 are cooking utensils such as a frying pan, a pot, an oven or the like. For example, when the frying pan is currently being used for cooking a food item, it is not possible to use the frying pan for cooking another food item. In this case, the icon 170 of the frying pan is not indicated on the monitor screen 160. Therefore, the player needs to keep paying attention to the icons 170 in order to confirm as to which cooking utensils are available.

Characters 172 indicated at the lower part of the monitor screen 160 are guests for the restaurant. There are two types of guest. One type is an ordinary guest, and the other type is so-called a gourmet. The gourmet is very particular about foods and the evaluation by the gourmet is very influential on other guests. Therefore, if the gourmet commented that a served food item is delicious, other guests become likely to evaluate that the food item is delicious, which will result in the upgrade of the restaurant's rank. Similarly, when if the gourmet commented that a served food item is terrible, other guests become likely to evaluate that the food item is terrible, which will result in the downgrade of the restaurant's rank.

The upper left side of the monitor screen 160 is an order area 174. Rectangular order panels 176 indicative of the respective orders of guests are listed vertically in order of time. Names and icons 178 (food icon) of food items ordered by the guests are displayed on the order panels 176. Further, icons 180 (process icon) indicative of the current processes of the food items which are being cooked are displayed.

The order panels 176 moves slowly in the left direction as time advances. If one of the order panels 176 has disappeared completely from the screen monitor 160 before all the processes of the food item of the order panel is finished, the guest who ordered the food item will get angry and leave the restaurant without waiting for the food item to be served any more. If this occurs, the rank of the restaurant is downgraded.

It takes a certain period of time to carry out cooking processes such as "boiling" and "grilling". When the cooking process "boiling" is started, the color of the related order panel 176 starts to change from blue to red, for example. The color indicates the extent of "boiling". That is, by the color of the order panel 176, the player can adjust the extent of "boiling" and recognize the remaining length of waiting time. Thus, the player can utilize the waiting period for cooking other food items.

Cooking can be performed by selecting the order panel 176 displayed on the order area 174 so that appropriate cooking processes corresponding to the food item of the selected order panel 176 can be carried out. The order panel 176 can be selected by manipulating the left swivel control member 44 upwardly or downwardly. At this time, a cursor 182 in a shape of a hand moves in accordance with the movement of the left swivel control member 44. That is, when the cursor 182 comes to a desirable order panel 176 to be selected, the player can select the order panel 176 by pressing the ○ button (pressable control member 112d).

Next, the processes of cooking typical food items will be briefly explained hereinbelow. For example, as described above, the cooking processes of "Chinese noodle" may include "cutting food materials", "boiling noodle and food materials" and "seasoning". The process of "cutting food materials" can be carried out by slightly tilting the left swivel control member 44 in the left direction, while moving the right swivel control member 46 upwardly and downwardly. As shown in FIG. 10, when the left swivel control member 44 tilts in the left direction, a left hand 184 moves slowly in the left direction. When the right swivel control member 46 moves upwardly and downwardly, a kitchen knife 186 moves upwardly and downwardly, thereby cutting a food material 188.

Figure 11:
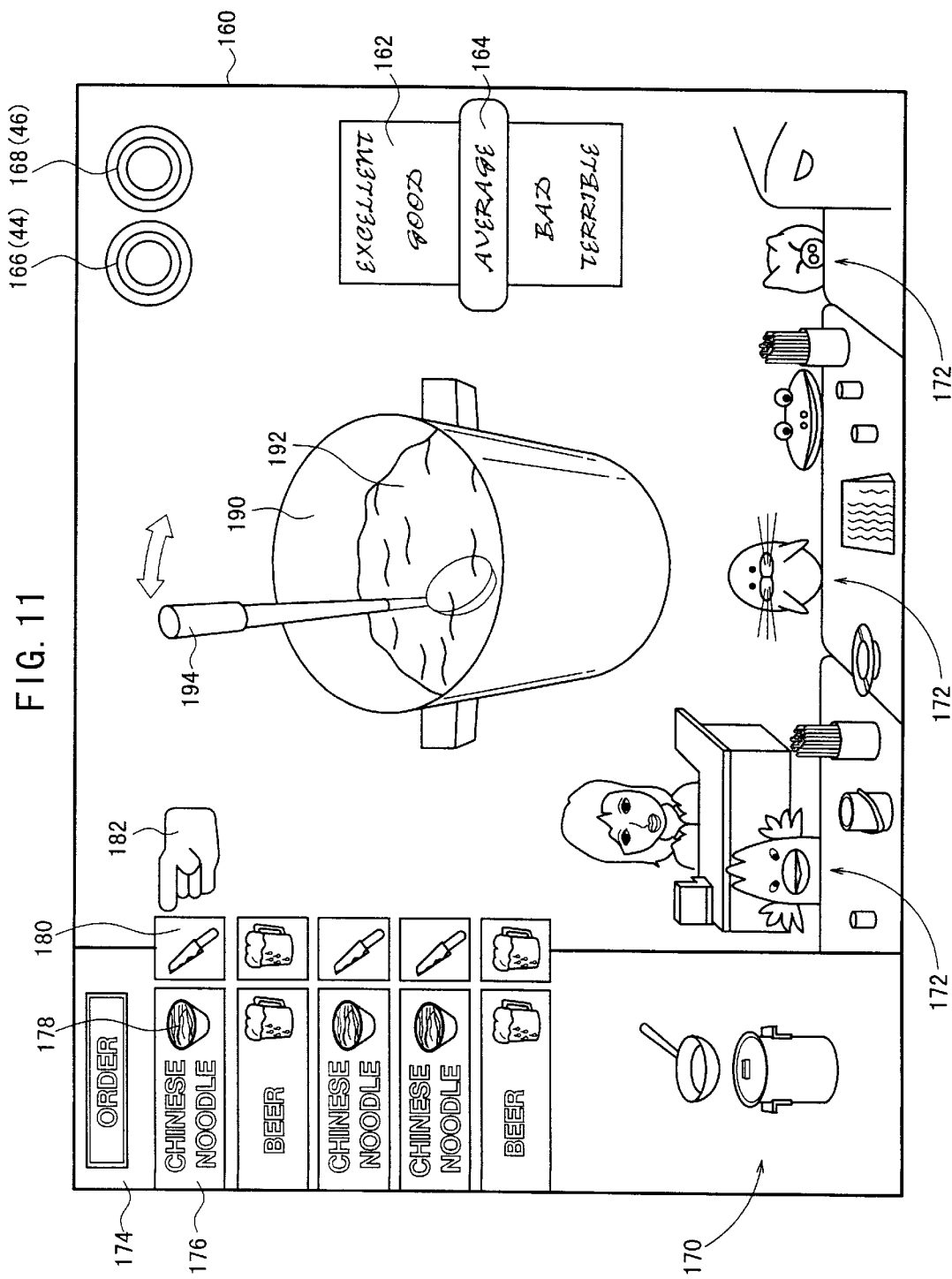
FIG. 11 is a view showing a condition in which a "boiling" process of Chinese noodle is carried out on the monitor screen.
Figure 12:
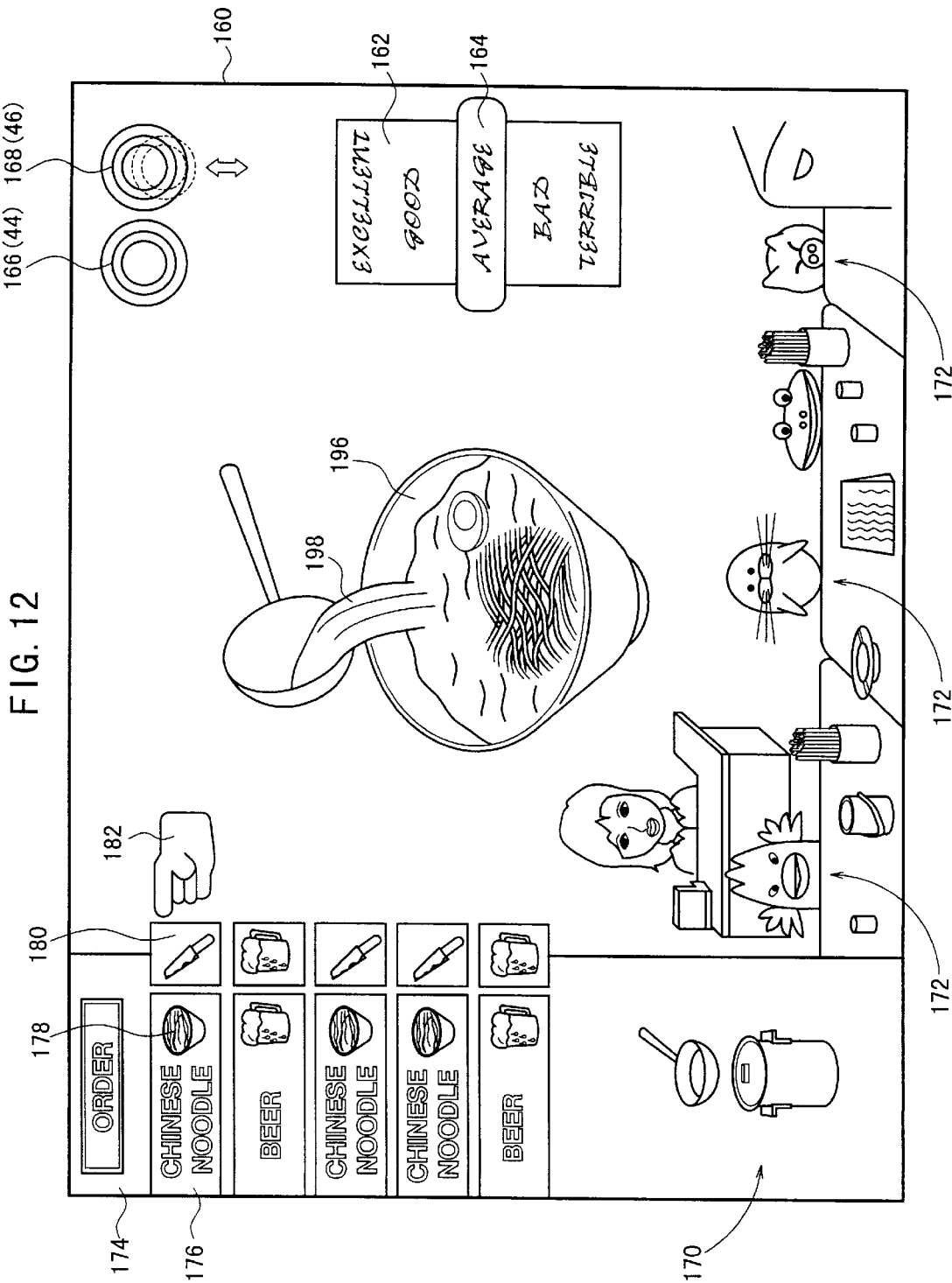
FIG. 12 is a view showing a condition in which a "seasoning" process of Chinese noodle is carried out on the monitor screen.

The process of "boiling noodle and food materials" is shown in FIG. 11. When the process of "boiling noodle and food materials" is started, an animation of stirring a food material 192 in a stockpot 190 with a ladle 194 is displayed on the display monitor 160. When the player considers that an appropriate time has been passed, the player can finish the boiling process by pressing the ○ button (pressable control member 112*d*). As shown in FIG. 12, the process of "seasoning" can be carried out by tilting the right swivel control member 46 downwardly such that seasoning soup 198 is added into a bowl 196.

Figure 13:
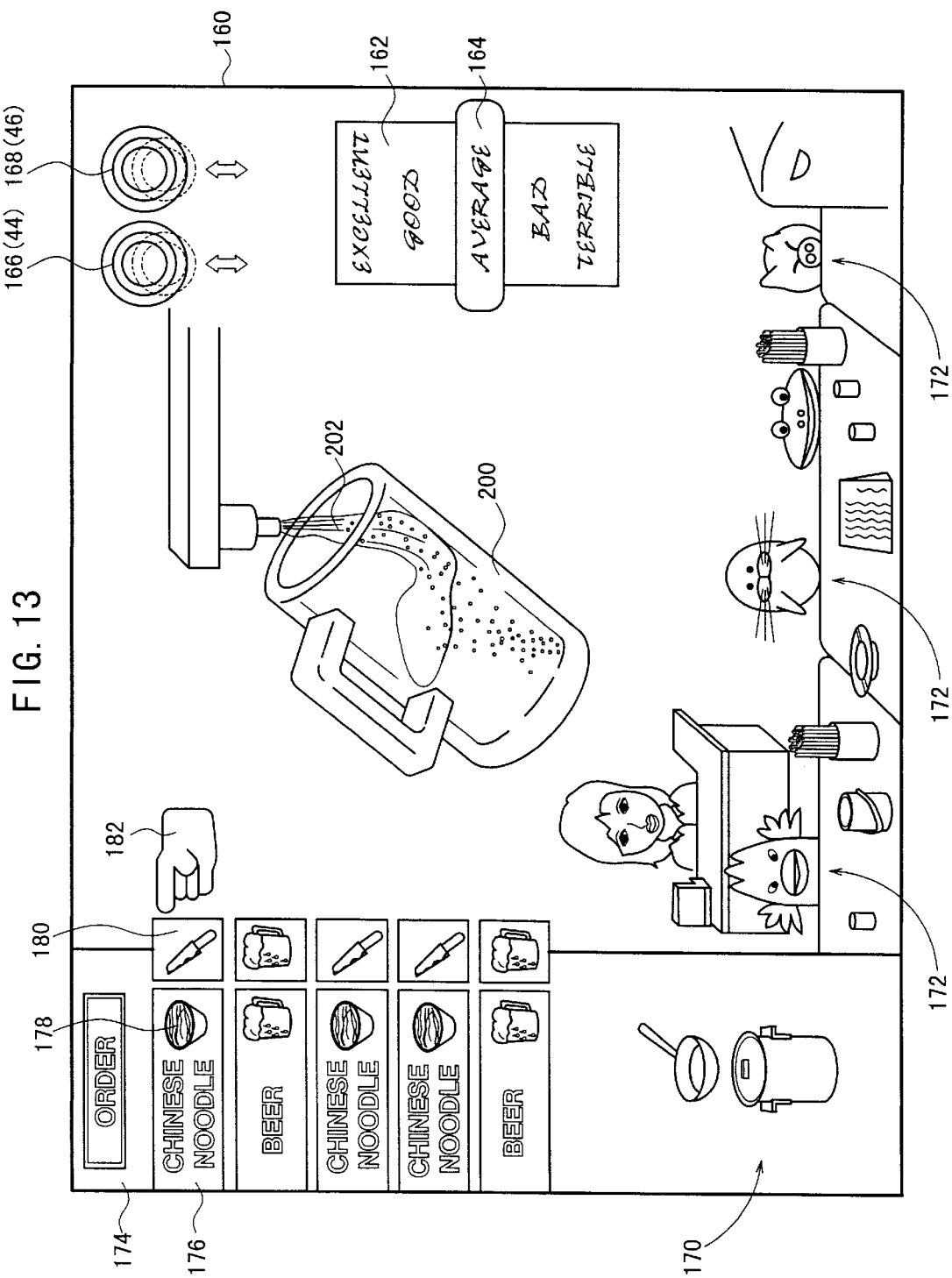
FIG. 13 is a view showing a condition in which "pouring" process of beer is carried out on the monitor screen.
Figure 14:
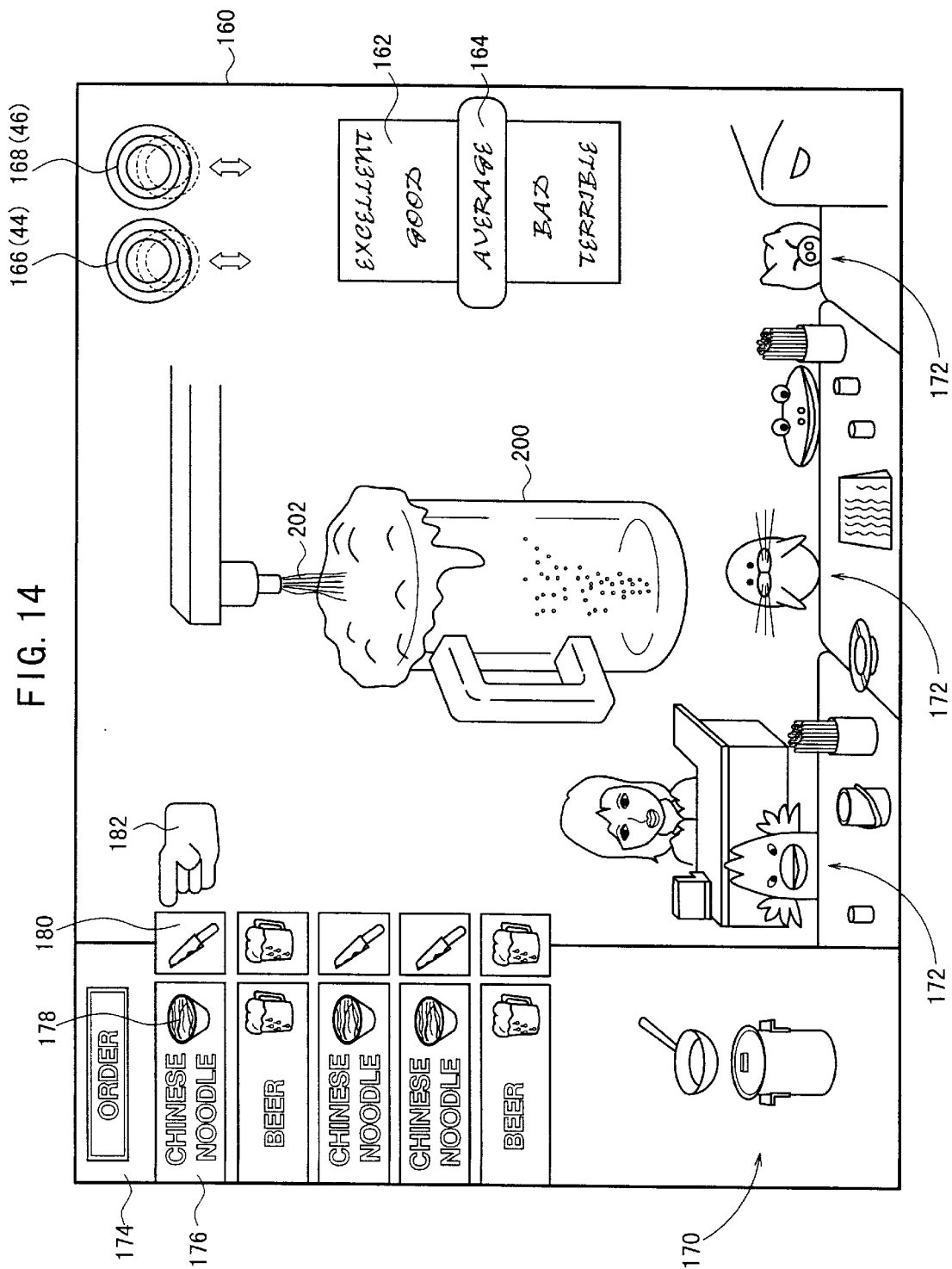
FIG. 14 is a view showing a condition in which a "pouring" process of beer is finished on the monitor screen.

Next, the cooking process of "beer" is explained with reference to FIGS. 13 and 14. The food item "beer" can be cooked by a single "pouring" process. As shown in FIG. 13, by tilting the left and right swivel control members 44 and 46, beer 202 can be poured into a beer mug 200. Thereafter, the process is completed by releasing the left swivel control member 44 so that the left swivel control member can move back to its neutral position, thereby moving the beer mug 200 to stand upright as shown in FIG. 14.

The cooking processes of "French fries" may include "frying" and "sprinkling salt". The "frying" process can be carried out in a similar manner to the "seasoning" process of "Chinese noodle".

The cooking process of "hamburger" may include "cutting", "air-releasing", "grilling" and "adding ketchup".

Figure 15:
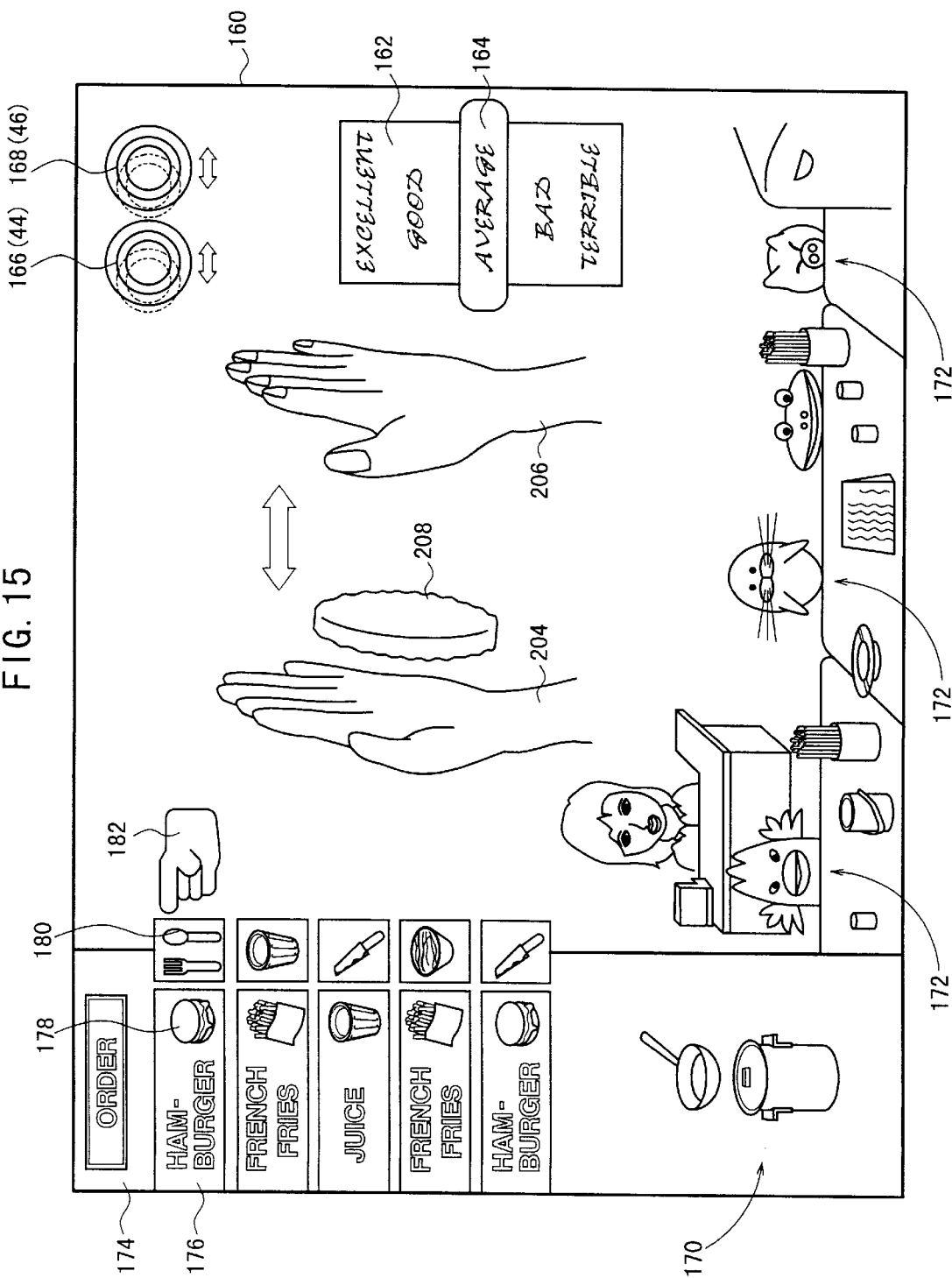
FIG. 15 is a view showing a condition in which an "air-releasing" process of hamburger is carried out on the monitor screen.

The "cutting" process can be carried out in a similar manner to the process of "cutting food materials" of "Chinese noodle". The "grilling" process can be carried out in a similar manner to the "boiling" process of "Chinese noodle". The process of "adding ketchup" can be carried out in a similar manner to the "seasoning" process of "Chinese noodle". In the process of "air-releasing", as shown in FIG. 15, air in a food material 208 is released (adjusted) with a left hand 204 and a right hand 206. The amount of air contained in the food material 208 affects the taste of the hamburger. The left hand 204 and the right hand 206 moves in accordance with the movement of the left swivel control member 44 and the right swivel control member 46, respectively. The left and right swivel control members 44 and 46 are alternately tilted in the left direction and right direction. In this case, the left and right swivel members 44 and 46 are tilted substantially in the same direction. By this manipulation, the food material 208 is tossed to and from between the left hand 204 and the right hand 206.

Figure 16:
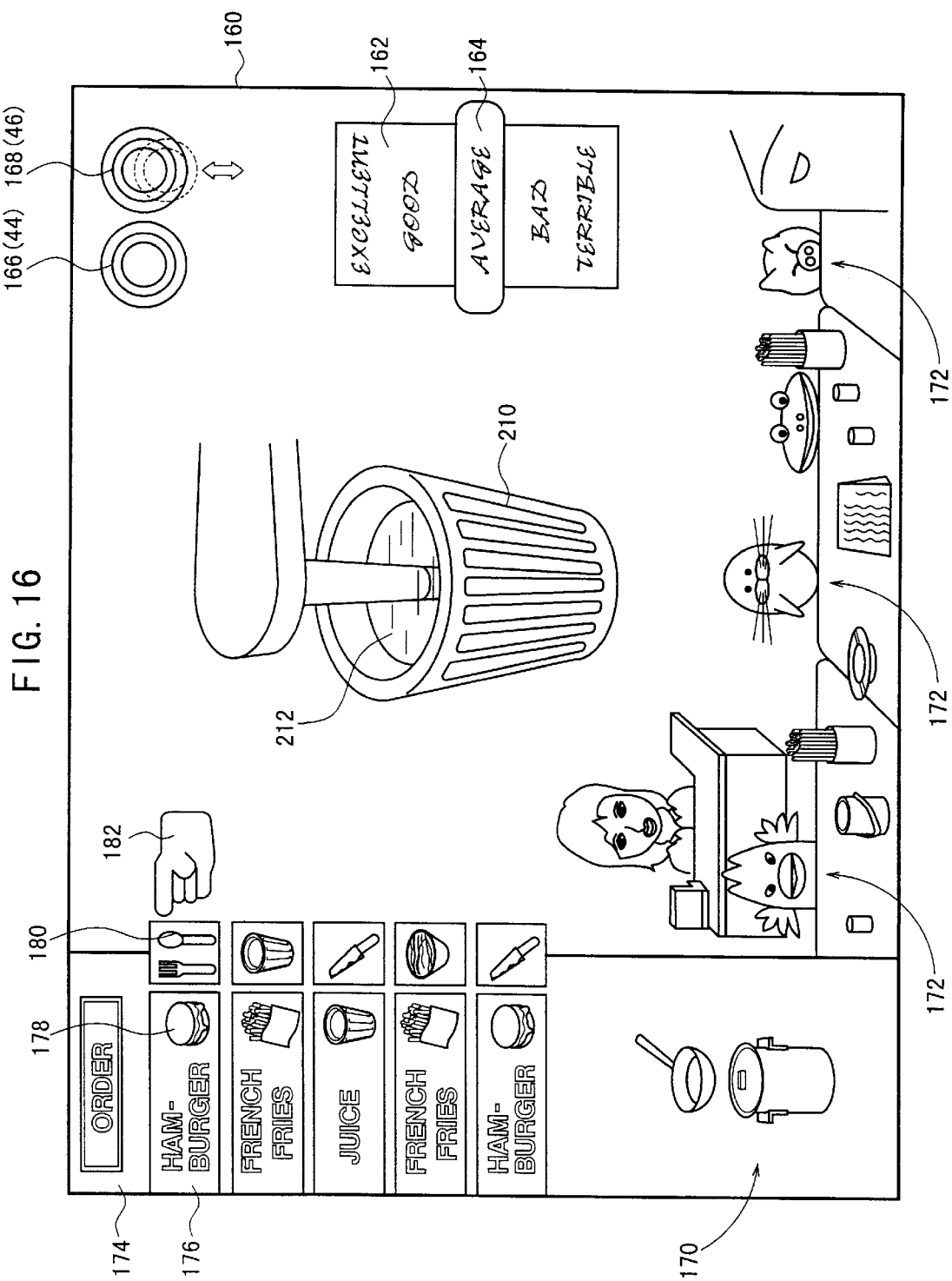
FIG. 16 is a view showing a condition in which "pouring" process of juice is carried out on the monitor screen.

The cooking process of "juice" only includes a single "pouring" process. Unlike the "pouring" process of "beer", as shown in FIG. 16, the "pouring" process of "juice" can be carried out by simply tilting the right swivel control member 46 downwardly such that juice 212 is appropriately filled into the glass 210 without spilling out.

In the cooking game, an obstructive character system is adopted in all of the story mode, three-minute cooking mode, and competition mode. For example, when the player is cooking according to the orders of guests, it happens that a yellow icon (not shown) is displayed in the order area 174. The icon indicates a character or a condition which obstructs the business of the restaurant or disturbs the player's cooking, with the result that the guests leave the restaurant. Therefore, if the obstructive icon is displayed in the order area 174, the player needs to take some actions to attend to or eliminate the obstructive character or condition (hereinafter simply referred as obstructive character). While the player attends to or eliminates the obstructive character, the cooking process is suspended.

In the competition mode, if the player finishes cooking of two or more food items at the same time, the player can send the obstructive character to the opponent side.

The types of the obstructive characters are "drunken person", "cockroach", "dishwashing", "eat and run", "money change" and the above-described "gourmet".

In the case of "drunken person", a telephone is displayed on the display monitor 160. The player needs to manipulate the left swivel control member 44 such that buttons of the telephone can be pushed, and the designated telephone number is inputted for calling the police. By tilting the right swivel control member 46, dialing is completed. Then, policemen come to the restaurant to arrest the drunken person.

In the case of "cockroach", the player needs to manipulate the left swivel control member 44 for moving an image of a slipper and manipulating the right swivel control member 46 for spanking cockroaches with the slipper. All the cockroaches should be eradicated for escaping from this situation.

In the case of "dishwashing", the player needs to rotate the right swivel control member 46 for washing dishes.

In the case of "eat and run", the player needs to alternately move the left and right swivel control members 44 and 46 upwardly and downwardly for running after the criminal person. This situation is presented on the monitor screen 160, which is ended when the main character catches up with the criminal person.

Next, an example of the system and operation of the scenario progressing means 300 will be described with reference to FIGS. 9 and 17 through 34.

The scenario progressing means 300 may be supplied via randomly accessible recording medium such as a CD-ROM or the memory card 14, or via network to the entertainment system 10. For exemplary purpose, the scenario progressing means 300 which is supplied by the optical disk 20 such as a CD-ROM will be explained below. The scenario progressing means 300 is read and executed by the entertainment system 12.

Specifically, the optical disk 20 is played back by the entertainment apparatus 12 such that the scenario progressing means 300 is downloaded from the optical disk 20 to a main memory in the control system 82 of the entertainment apparatus 12 by a predetermined process. Thereafter, the scenario progressing means 300 is executed by the CPU 80 of the control system 82.

The scenario progressing means 300 comprises story developing means 302, three-minute cooking processing means 304 and competition processing means 306. The story developing means 302 allows the players to virtually experience a cooking operation in a kitchen of a restaurant registered with a restaurant information table from opening time to closing time of the restaurant. The three-minute cooking processing means 304 allows the player to virtually experience a cooking operation in a kitchen of a restaurant registered with the restaurant information table for a predetermined period of time (for example, three minutes). The competition processing means 306 allows the player to virtually experience a cooking operation in a kitchen of a restaurant registered with the restaurant information table while playing a match game with a plurality of other players.

The story developing means 302 comprises cooking guidance processing means 308 for providing the player with information about each of the food items registered with the restaurant information table and information about manipulating method of cooking each of the food items, cooking trial processing means 310 for allowing the player to try to perform the process of cooking each of the food items, cooking process progressing means 312 for progressing the process of cooking each of the food items based on data inputted by the player, evaluation processing means 314 for evaluating the status of cooking progress and progress obstructing means 316 for obstructing the cooking progress.

Both of the cooking guidance processing means 308 and cooking trial processing means 310 further comprise process performing means 318 for performing at least one cooking process which is predetermined for each of the food items, based on the data inputted by the player. Further, the cooking process progressing means 312 comprises the process performing means 318 and guest appearance processing means 320 for allowing a plurality of guests to appear (to be displayed) on the display screen 160 and for creating an order file for registering orders of the respective guests.

The three-minute cooking processing means 304 comprises the cooking process progressing means 312, the evaluation processing means 314, and the progress obstructing means 316. Further, the competition processing means 306 comprises the cooking process progressing means 312 and the evaluation processing means 314.

Next, processing sequence of the scenario progressing means 300 will be described with reference to flow charts of FIG. 17 through 34.

Figure 17:
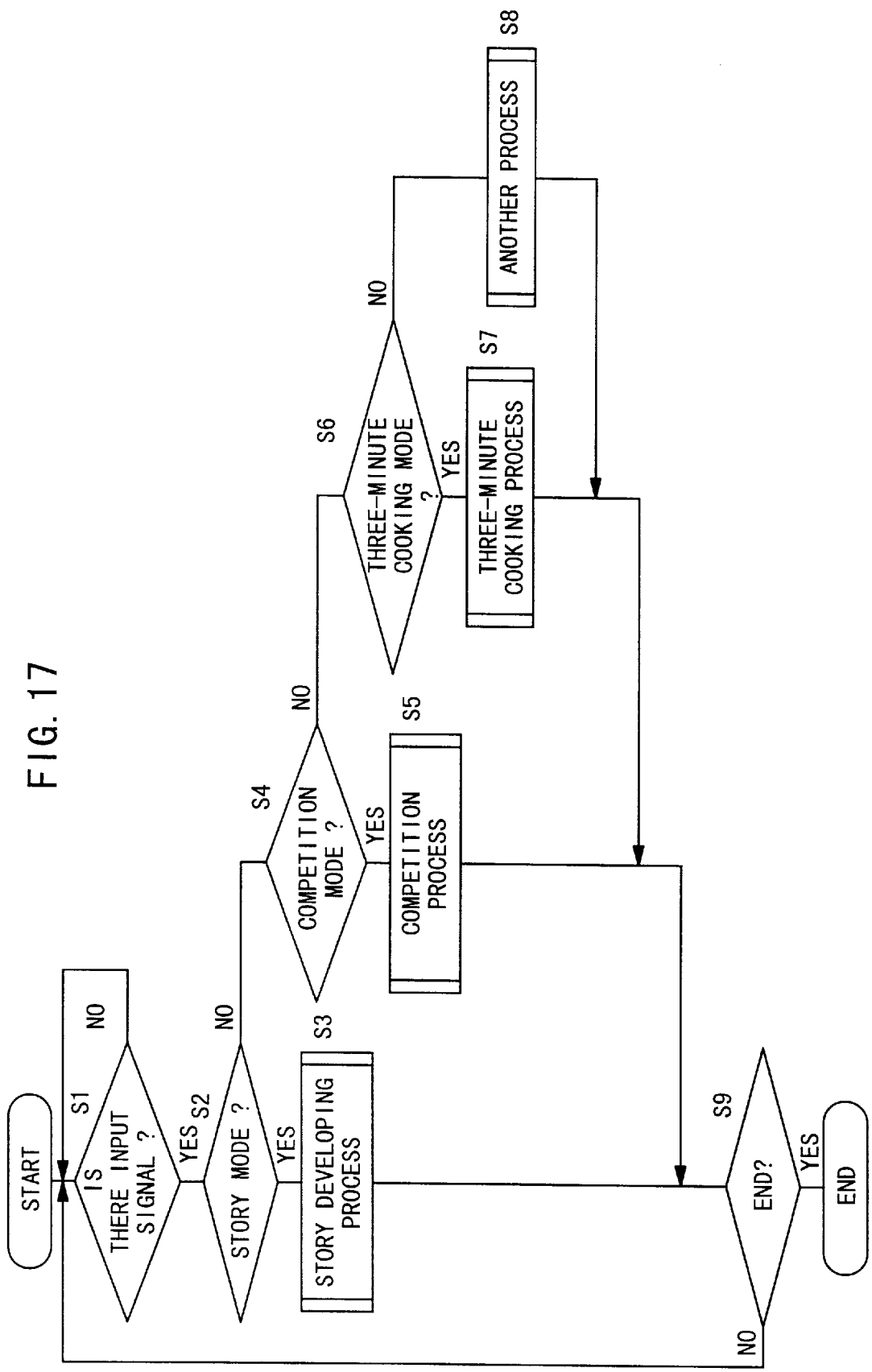
FIG. 17 is a flow chart showing a processing sequence of the scenario progressing means.

In Step S1 of FIG. 17, an input signal from the manual controller 16 is awaited. If there is an input signal from the manual controller 16, the control goes to Step S2. In Step S2, it is determined whether the input signal is for the story mode or not. If it is determined that the input signal is for the story mode, the control goes to Step S3 for performing the process of the story developing means 302.

If it is determined that the input signal is not for the story mode in Step S2, the control goes to Step S4 for determining whether the input signal is for the competition mode or not. If it is determined that the input signal is for the competition mode, the control goes to Step S5 for performing the process of the competition processing means 306.

In Step S4, if it is determined that the input signal is not for the competition mode, the control goes to Step S6 for determining whether the input signal is for the three-minute cooking mode or not. If it is determined that the input signal is for the three-minute cooking mode, the control goes to Step S7 for performing the process of the three-minute cooking processing means 304.

In Step S6, if it is determined that the input signal is not for the three-minutes cooking mode, the control goes to Step S8 for performing another process (for example, optional process) based on the input signal.

When any one of the process in Step S3, Step S5, Step S7, or Step S8 is finished, the control goes to Step S9 for determining whether there is an request for ending the scenario progressing means 300 or not.

If there is not an request for ending the scenario progressing means 300, the control goes back to Step S1 for waiting for the next input signal from the manual controller 16. If there is a request for ending the scenario progressing means 300, the process of the scenario progressing means 300 is brought to an end.

Next, the respective processing sequences of the story developing means 302, the competition processing means 306 and the three-minutes cooking processing means 304 will be described with reference to FIGS. 18 through 34.

The restaurant information table and food item information tables are utilized for the process of the story developing means 302. As shown in FIG. 18, the restaurant information table comprises a plurality of records (i=0, 1, . . . ) for storing information of different restaurants. The record comprises data units for storing various items of information about a restaurant such as types of food items, a number indicative of accommodation capacity of the restaurant (accommodation capacity number), and an appearance level of obstructive characters. The data units for the types of food items store data indicative of specific names of food items such as "Chinese noodle" and "beer" or the like. If a data unit does not store data indicative of a name of a food item, the data unit stores an initial value such as "FFFF". In the example of FIG. 18, in the restaurant corresponding to the record 0, two types of food items are available. In the restaurant corresponding to the record 1, three types of food items are available.

The data unit for the appearance level of obstructive characters stores natural numbers ranging from 1 to 10 corresponding to the appearance ratio. If the appearance ratio is 70%, numbers from 1 to 7 are stored in the data unit. If the appearance ratio is 30%, numbers from 1 to 3 are stored in the data unit.

FIGS. 19A through 19C show the food item information tables for storing information of different food items. Specifically, the food item information table stores a name of a food item, program numbers of the process performing means 318 for performing processes of cooking the food item, and relevance flags each indicating the relevancy of a cooking process. In this case, the relevancy of a cooking process means whether the cooking process for one guest is relevant to the same cooking process of other guests or not. That is, when a cooking process is determined to be relevant, the cooking process can be performed for a plurality of guests at the same time.

For example, in the case of "Chinese noodle", as shown in FIG. 19A, three program numbers for three different process performing means 318, that is, a program number of the process performing means 318 for performing a cutting process, a program number of process performing means 318 for performing a boiling process, a program number of process performing means 318 for performing a seasoning process, are stored in the respective records.

The value of the relevance flag indicates the relevancy of a cooking process. If the value of the relevance flag is "1", the cooking process has relevancy. If the value of the relevance flag is "0", the cooking process does not have relevancy. In the case of "Chinese noodle", the cutting process needs to be performed separately for each of a plurality of guests in the restaurant, since the value of the relevance flag for the cutting process is "0". After the cutting process for the guests are performed separately, the boiling process for all of the plurality of guests can be performed at one time, since the value of the relevance flag for the boiling process is "1". That is, it is possible to perform the boiling process for the plurality of guests at the same time so that time needed for the cooking process can be reduced substantially.

Figure 20:
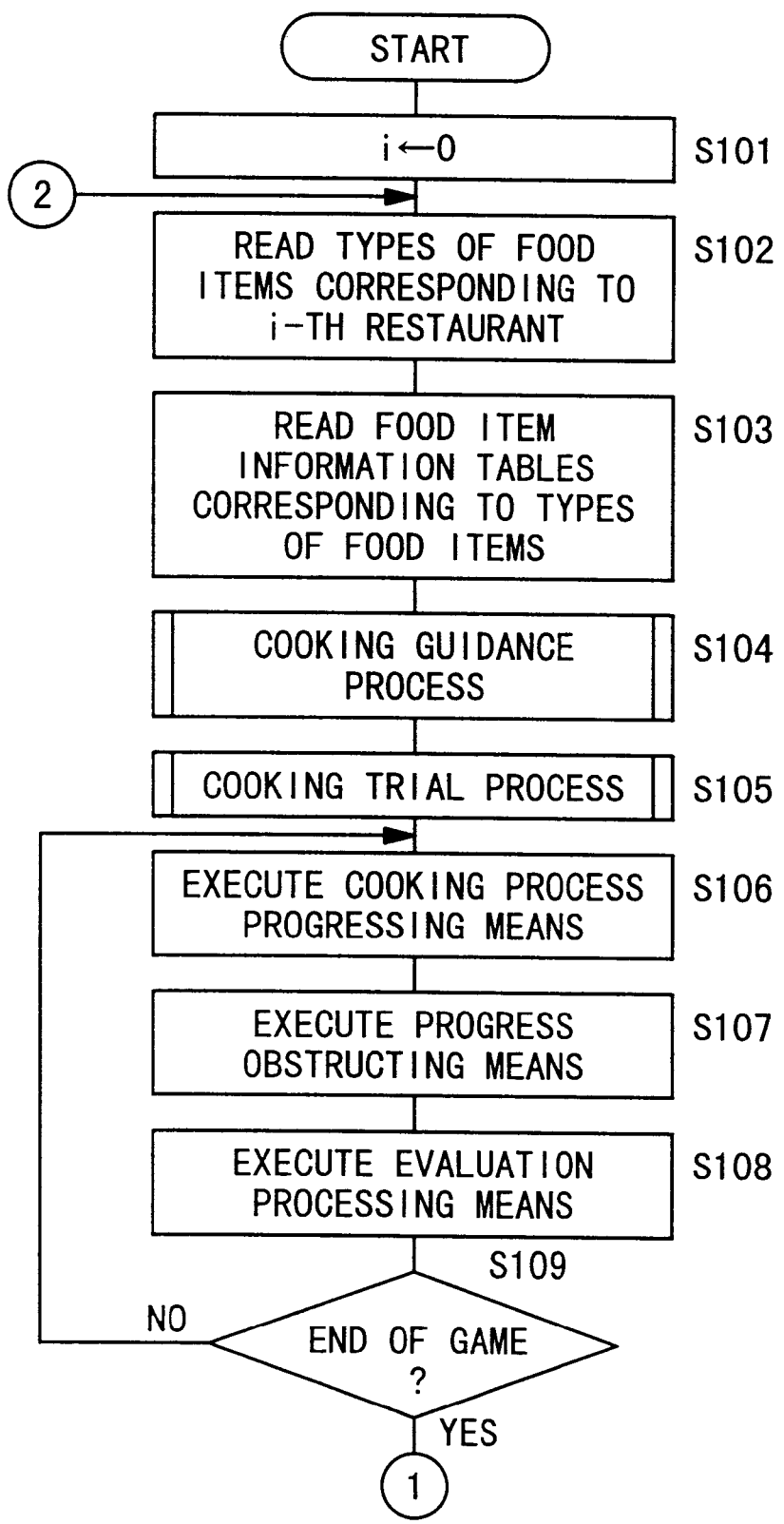
FIG. 20 is a flow chart (No. 1) showing a processing sequence of story developing means.

In Step S101 of FIG. 20, the story developing means 302 stores an initial value "0" in an index register i used for retrieval of a restaurant and initializes the index register i.

Next, in Step S102, types of food items corresponding to i-th restaurant are read from the restaurant information table.

At this time, the number of food items M is determined. Then, the control goes to Step S103.

In Step S103, food item information tables corresponding to the types of food items read in Step S102 are read from the optical disk 20. For example, if i=0, since "Chinese noodle" and "beer" are available in the corresponding restaurant, the food item information table of "Chinese noodle" (See FIG. 19A), and the food item information table of "beer" (See FIG. 19B) are read.

Figure 22:
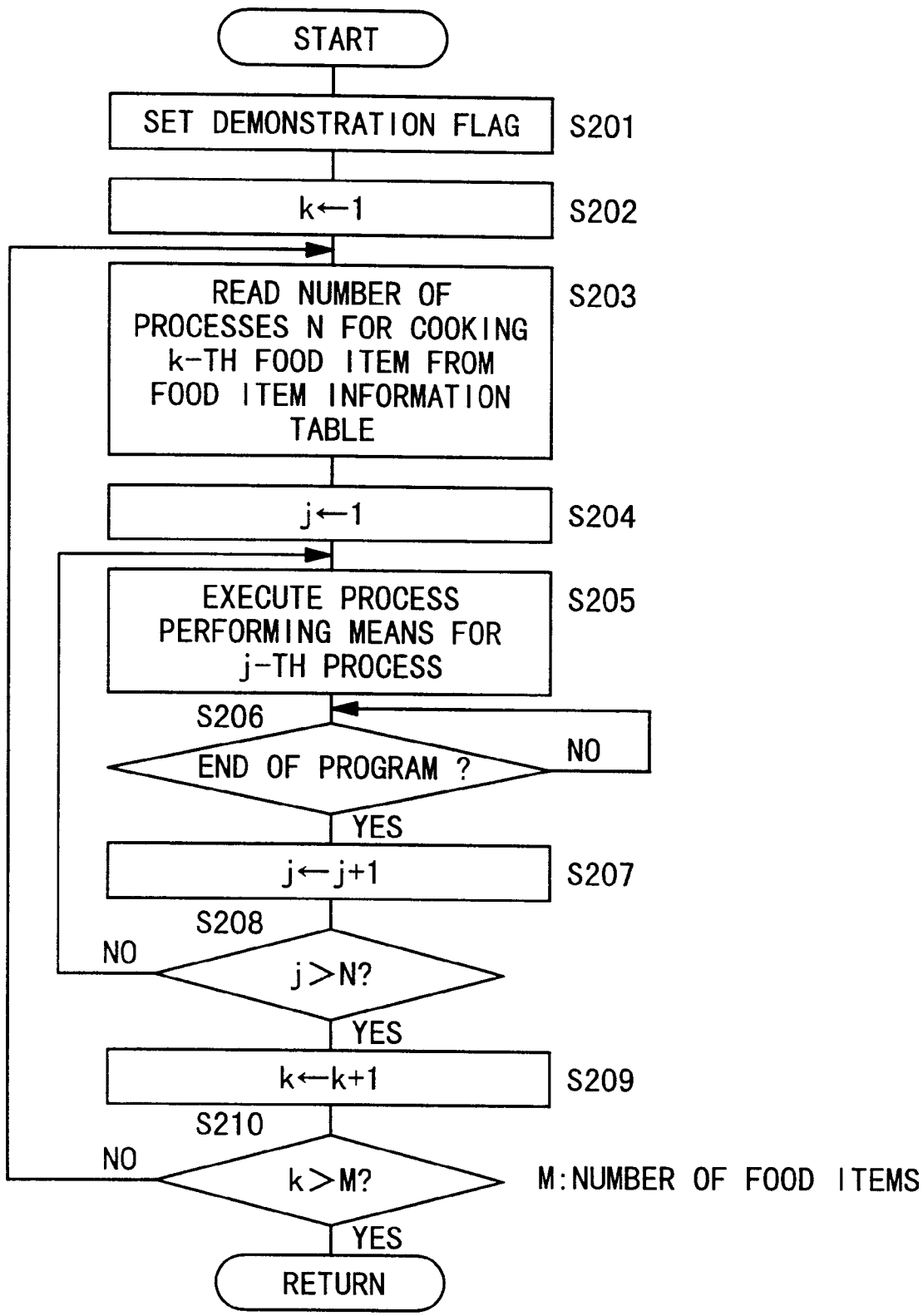
FIG. 22 is a flow chart showing a processing sequence of cooking guidance processing means.

Then, in Step S104, the process of the cooking guidance processing means 308 is performed. The process in Step S104 is shown in FIG. 22 more specifically. In Step S201, a value such as "1" is set to a demonstration flag. Then, the control goes to Step S202.

In Step S202, the cooking guidance processing means 308 stores an initial value "1" in an index register k used for retrieval of a food item and initializes the index register k.

Next, in Step S203, the number of processes N for cooking k-th food item registered with the record (i-th record) of the restaurant information table is read from the food item information table read in Step S103. Then, the control goes to Step S204.

In Step S204, the cooking guidance processing means 308 stores an initial value "1" in an index register j used for retrieval of a process for cooking a food item and initializes the index register j.

Then, in Step S205, a program (the process performing means 318) for j-th process in the food item information table for the k-th food item is executed.

Figure 23:
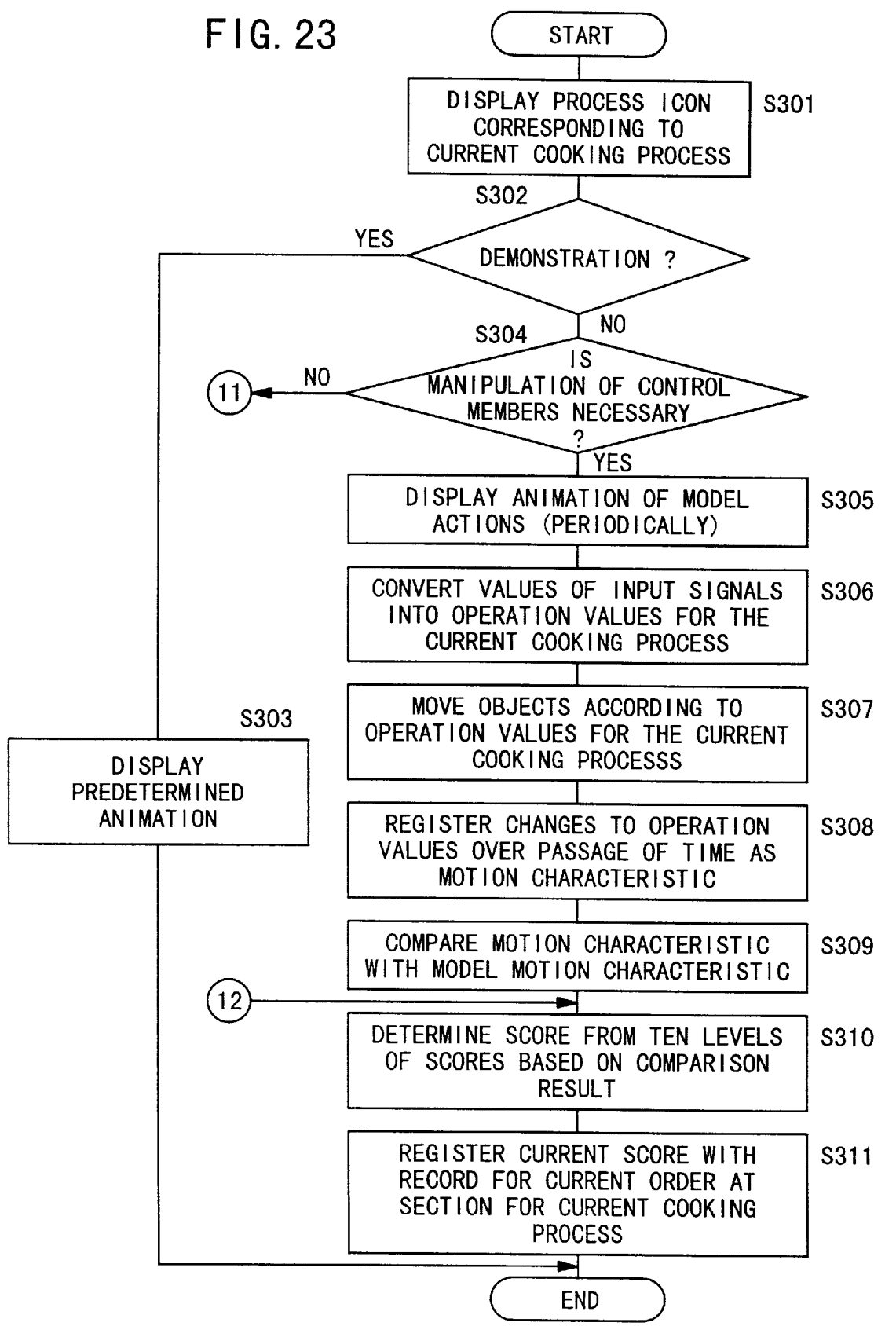
FIG. 23 is a flow chart (No. 1) showing a processing sequence of process performing means.

The process of the process performing means 318 is shown in FIG. 23.

In Step S301, the process icon 180 corresponding to the current cooking process being executed is displayed at the right side of the order panel 176.

Next, in Step S302, it is determined that whether the cooking process being executed is a demonstration or not. If the cooking process performing means 318 is executed by the cooking guidance processing means 308, it is determined that the cooking process being executed is a demonstration, since the value of the demonstration flag has been set to "1" in Step S201. Then, the control goes to Step S303.

In Step S303, a predetermined animation for demonstrating the cooking process is displayed on the display monitor 160. When the animation is finished, the process of the process performing means 318 is brought to an end, temporarily.

Then, the routine of FIG. 22 will be described again form Step S206. In Step S206, the end of the process of the process performing means 318 is awaited. When the process of the process performing means 318 is ended, the control goes to Step S207 for updating the value of the index register j to be incremented by 1. Then, in Step S208, it is determined whether animations for all the cooking processes of the food item have been displayed or not based on the value of the index register j. If the value of the index register j is larger than the number of processes N, it is determined that animations for all the cooking processes have been displayed.

If animations for all the cooking processes have not yet been displayed, the control goes back to Step S205 for displaying an animation of the next cooking process. When animations for all the cooking processes are displayed, the control goes to Step S209 for updating the value of the index register k to be incremented by 1. Then, the control goes to Step S210. In Step S210, it is determined whether the guidance for all of the food items of the restaurant has been finished or not. If the value of the index register k is larger than the number of food items M, it is determined that the guidance (demonstration) for all of the food items has been finished.

If the guidance for all of the food items is not finished, the control goes back to Step S203 for performing the guidance of the next food item. When the guidance for all of the food items is finished, the process of the cooking guidance processing means 308 is brought to an end.

Figure 25:
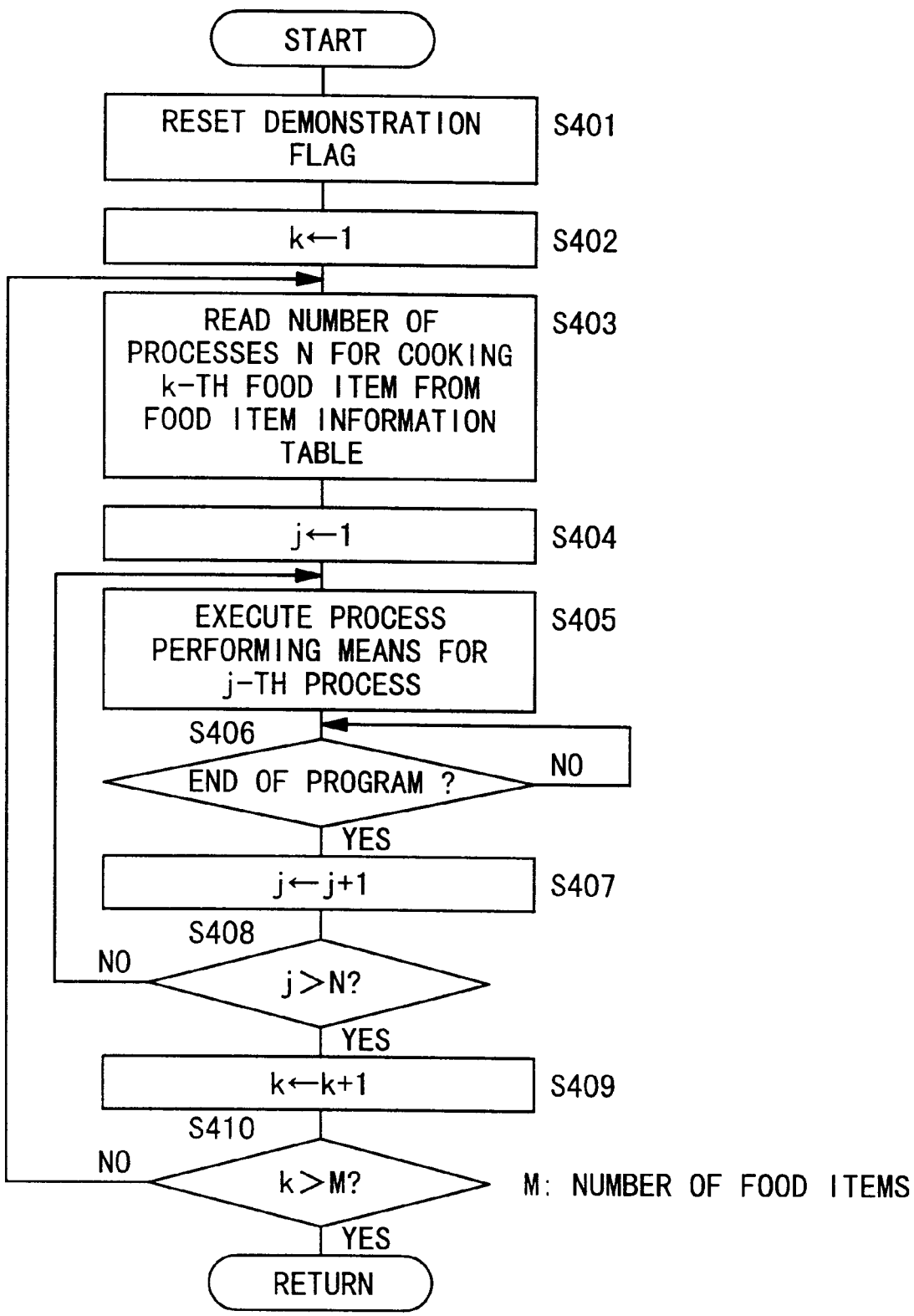
FIG. 25 is a flow chart showing a processing sequence of cooking trial processing means.

Then, the main routine of FIG. 20 will be described again from Step S105. In Step S105, the process of the cooking trial processing means 310 is performed. The process in Step S105 is shown in FIG. 25 more specifically. In Step S401, the value of the demonstration flag is reset, e.g., to "0". Then, the control goes to Step S402.

In Step S402, the cooking trial processing means 310 stores an initial value "1" in an index register k used for retrieval of a food item and initializes the index register k.

Next, in Step S403, the number of processes N for cooking k-th food item registered with the record (i-th record) of the restaurant information table is read from the food item information table. Then, the control goes to Step S404.

In Step S404, the cooking trial processing means 308 stores an initial value "1" in an index register j used for retrieval of a process for cooking a food item and initializes the index register j.

Then, in Step S405, a program (the process performing means 318) for j-th process in the food item information table for the k-th food item is executed.

An order file as shown in FIG. 26 is used for the process of the process performing means 318. Each record (record 1, record 2, . . . ) of the order file corresponds to orders of guests (order 1, order 2, . . . ) and stores data indicative of a name of a food item, an identification flag (special guest flag) indicating whether a guest in the restaurant is a special guest or not, status information indicating a current status (a sequential number assigned based on the current cooking process), scores for respective cooking processes, an obstruction coefficient which varies depending on a measure taken against an obstructive character.

The process of the process performing means 318 will be further explained with reference to FIG. 23.

In Step S301, the process icon 180 corresponding to the current cooking process being executed is displayed at the right side of the order panel 176.

Next, in Step S302, it is determined whether the cooking process being executed is a demonstration or not. If the process performing means 318 is executed by the cooking trial processing means 310, it is determined that the cooking process being executed is not a demonstration, since the value of the demonstration flag has been reset to "0" in Step S401. Then, the control goes to Step S304.

In step 304, it is determined whether the cooking process requires input signals from the left and right swivel control members 44 and 46 or not. If it is determined that the cooking process requires input signals from the left and right swivel control members 44 and 46, the control goes to Step S305 for displaying an animation of model actions (motions) for the left and right control swivel members 44 and 46 at the upper right side of the monitor screen 160. The animation is displayed periodically.

Next, in Step S306, values of the input signals from the left and right swivel control members 44 and 46 (vertical values and horizontal values) are converted into operation values (for example, value for degree of leaning).

Then, in Step S307, objects displayed on the monitor screen 160 move according to the operation values. For example, in the case of "Chinese noodle", as shown in FIG. 10, the hand 206 moves in the left direction according to an tilting motion of the left swivel control member 44, while the kitchen knife 186 moves alternately in the upward direction and downward direction according to the up-and-down motion of the right swivel control member 46. Then, the control goes to Step S308.

In Step S308, changes to the operation values over the passage of time are registered with the memory as a motion characteristic. Then, in Step S309, the motion characteristic obtained in Step S308 is compared with the model motion characteristic. In Step S310, the score for the cooking process is determined based on the comparison result obtained in Step 309. There are ten levels of scores for evaluating the cooking process. Then, the control goes to Step S311.

In Step S311, the current score is registered with a record for the current order in the order file shown in FIG. 26, at a section for the current cooking process. If the process performing means 318 is executed by the cooking trial processing means 310, the record number is "1" (record 1).

Figure 24:
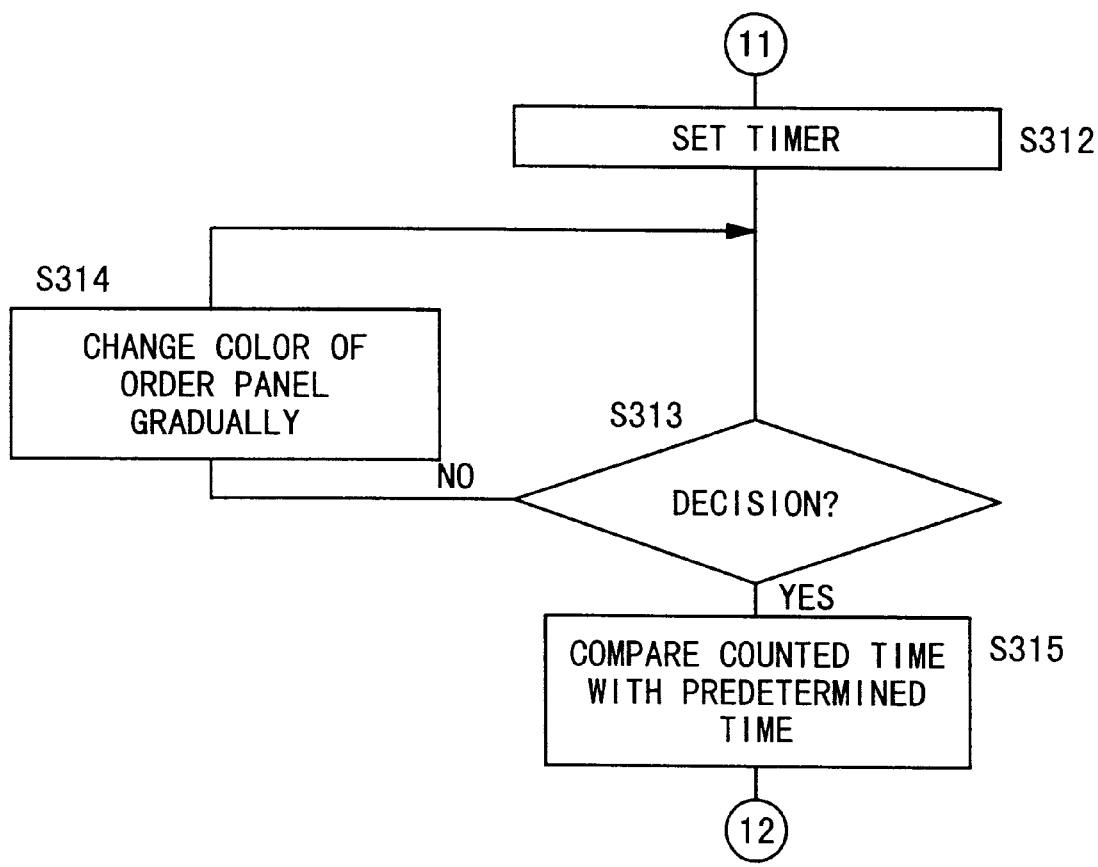
FIG. 24 is a flow chart (No. 2) showing a processing sequence of the process performing means.

In Step S304, if it is determined that the cooking process does not require input signals from the left and right swivel control members 44 and 46, the control goes to Step S312 shown in FIG. 24 for setting a timer. The timer counts time until the decision button (pressable control member 112d) is pressed. Then, in Step S313, it is determined whether the decision button has been pressed or not. If it is determined that the decision button has not been pressed, the control goes to Step S314. In Step S314, the process for gradually changing the color of the order panel 176 for the current cooking item from blue to red is performed.

When the decision button (pressable control member 112d) is pressed, the control goes to Step S315. In Step S315, the counted time is compared with a predetermined time. Then, the processes of Step S310 and the subsequent steps shown in FIG. 23 are performed. Thereafter, when the process in Step 311 is finished, the process of the process performing means 318 is brought to an end.

Then, the routine of FIG. 25 will be described again from Step S406. In Step S406, the end of the process of the process performing means 318 is awaited. When the process of the process performing means 318 is ended, the control goes to Step S407 for updating the value of the index register j to be incremented by 1. Then, in Step S408, it is determined whether all the processes for cooking the food item has been finished or not based on the value of the index register j. If the value of the index register j is larger than the number of processes N, it is determined that all the processes for cooking the food item have been finished.

If all the processes for cooking the food item have not been finished, the control goes back to Step S405 for performing the next trial process for cooking the food item based on input signals from the player. When the player's trial for all the processes for cooking the food item is finished, the control goes to Step S409 for updating the value of the index register k to be incremented by 1. Then, the control goes to Step S410. In Step S410, it is determined whether the player's trial for cooking all of the food items of the restaurant has been finished or not. If the value of the index register k is larger than the number of food items M, it is determined that the player's trial for cooking all of the food items of the restaurant has been finished.

If the player's trial for cooking all of the food items of the restaurant have not been finished, the control goes back to Step S403 for performing the player's trial for cooking the next food item. When the player's trial for cooking all of the food items of the restaurant has been finished, the cooking trial processing means 310 is brought to an end.

Then, the main routine of FIG. 20 will be described again from Step S106. In Step 106, the cooking process progressing means 312 is executed. In Step S107, the progress obstructing means 316 is executed. Then, in step S108, the evaluation processing means 314 is executed. The cooking process progressing means 312, the progress obstructing means 316, and the evaluation processing means 314 are executed by parallel processing, that is, multitask.

Figure 27:
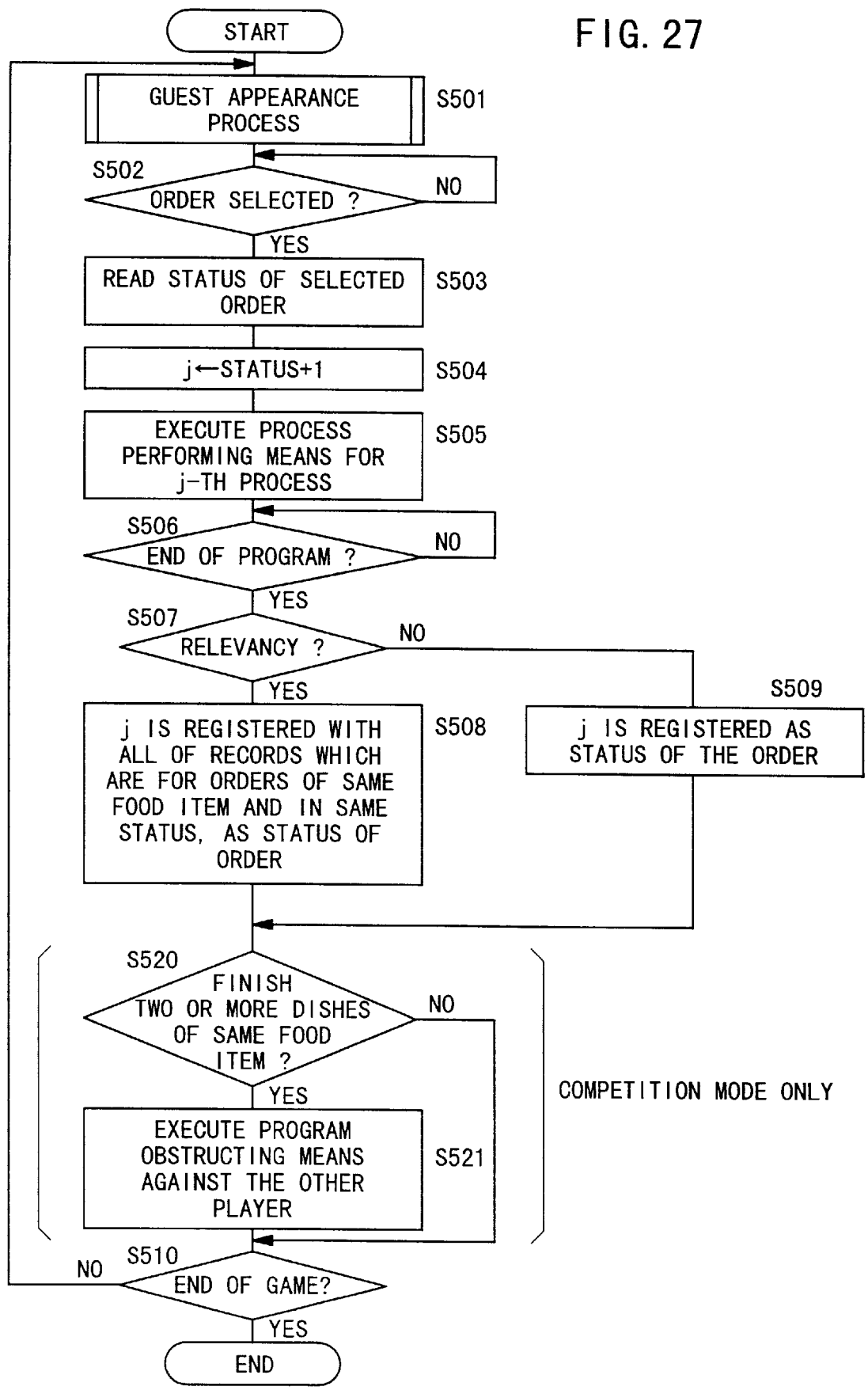
FIG. 27 is a flow chart showing a processing sequence of cooking progress processing means.
Figure 28:
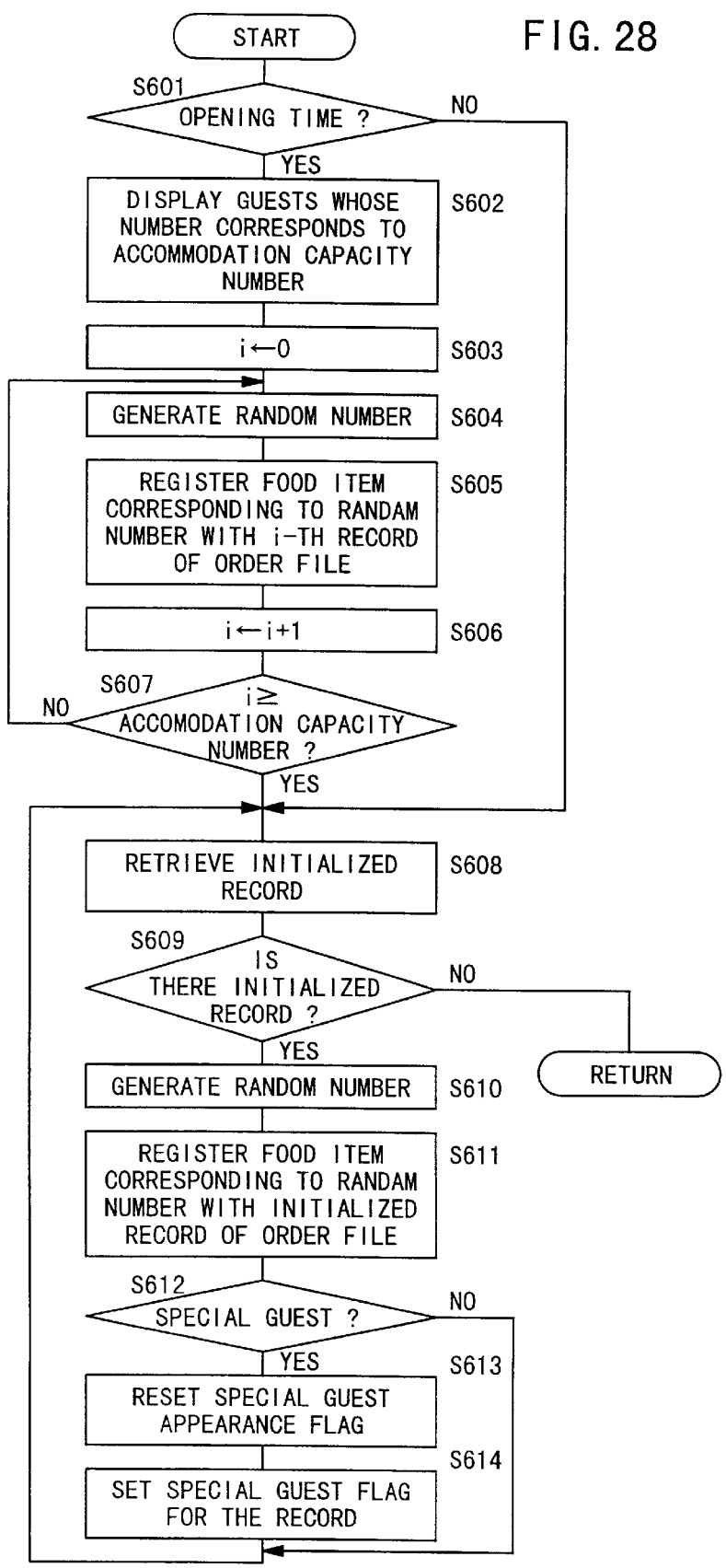
FIG. 28 is a flow chart showing a processing sequence of guest appearance processing means.

The explanation of the cooking process progressing means 312, the progress obstructing means 316, and the evaluation processing means 314 will be given hereinbelow. As shown in FIG. 27, in Step S501, the cooking process progressing means 312 performs the process of the guest appearance processing means 320. The process of the guest appearance processing means 320 is shown in FIG. 28. In Step S601, it is determined whether the process of the guest appearance processing means 320 is for the opening time of the restaurant or not. If it is determined that the process of the guest appearance processing means 320 is for the opening time of the restaurant, the control goes to Step S602 for displaying guests on the monitor screen 160. The number of the guests displayed on the monitor screen 160 corresponds to the accommodation capacity number registered with the restaurant information table.

Next, in Step S603, the guest appearance processing means 320 stores an initial value "0" in an index register i used for retrieval of an order and initializes the index register i. Then, the control goes to Step S604.

In Step S604, a random number is generated. In Step S605, the order (a name of a food item) corresponding to the random number is registered with the i-th record of the order file. Then, the control goes to Step S606 for updating the value of the index register i to be incremented by 1. Thereafter, in step S607, it is determined whether all the orders of the guests in the restaurant have been registered or not. If the value of the index register i is equal to or larger than the accommodation capacity number, it is determined that all the orders of the guests in the restaurant have been registered.

If it is determined that all the orders of the guests in the restaurant have not yet been registered, the control goes back to Step S604 for registering the next order. When all the order of the guests in the restaurant are registered, the control goes to Step S608 for retrieving an initialized record.

Next, in Step S609, it is determined whether there is an initialized record is or not. If it is determined that there is an initialized record, the control goes to Step S610 for displaying a guest on the monitor 160 and generating a random number. Thereafter, in Step 611, the order (name of a food item) corresponding to the random number is registered with the initialized record of the order file. Then, the control goes to Step S612.

In Step S612, it is determined whether the guest displayed on the monitor screen 160 is a special guest or not based on a special guest appearance flag. If the special guest appearance flag is set to "1", the guest is a special one. The special guest appearance flag is set by the progress obstructing means 316, which will be described later.

If a special guest is displayed on the display monitor 160, then the control goes to Step S613 for resetting the special guest appearance flag, e.g., to "0". Then, in Step S614, the special guest flag (identification flag) in the record of the order file is set to "1". Thereafter, the processes of Step 608 and the subsequent steps are repeated.

Next, in Step S609, if it is determined that there is no initialized record, the guest appearance processing means 320 is brought to an end.

The routine in FIG. 27 will be explained again from Step S502. In Step 502, it is determined whether an order is selected by an input signal from the manual controller 16 or not. When an order is selected, the control goes to Step S503 for reading the status of the record (a sequential number assigned based on the current cooking process) in the order file. The initial value of the status is "0". Then, the control goes to Step S504 for updating the value of the index register j used for retrieval of a cooking process to be incremented by 1.

Next, in Step 505, a program (the process performing means 318) for the j-th cooking process in the food item information table of the ordered food item is executed. The processing sequence of the process performing means 318 has been already described above and it will not be repeated for the purpose of brevity.

Thereafter, in Step S506, the end of the process of the process performing means 318 is awaited. When the process of the process performing means 318 is ended, the control goes to Step S507 for determining whether or not the current cooking process has relevancy using the relevance flag. If the value of the relevance flag of the j-th cooking process is "1", it is determined that the current cooking process has relevancy.

If it is determined that the current cooking process has relevancy, the control goes to Step S508. In Step 508, the value of the index register j is stored in all of the records which are for the same food item and in the same status. In this manner, the cooking process having relevancy such as the "boiling" process can be carried out for a plurality of guests at the same time. That is, it is not necessary to repeat the "boiling" process for the plurality of guests.

If it is determined that the current cooking process does not have relevancy, the control goes to Step S509. In Step S509, the value of the index register is stored in the record as the current status of the order. Then, the control goes to Step S510.

In Step S510, it is determined whether the game has been ended or not. That is, in Step S510, it is determined whether there is a game end instruction for ending the game or not. The game end instruction for ending the game is generated, when the evaluation processing means 314 determines that the rank of the restaurant is either of the highest or the lowest.

If it is determined that the game has not been ended, the control goes back to the Step S501 for selecting the next order. If it is determined that the game has not been ended, the process of the cooking process progressing means 312 is brought to an end.

Next, the progress obstructing means 316 will be explained with reference to flow charts of FIGS. 29 and 30.

In Step S701, the obstruction appearance numbers (the obstruction appearance level) are read from the record of the restaurant in which the player is currently cooking, in the restaurant information table. The obstruction appearance numbers indicate how frequent the obstructive characters are displayed on the monitor screen 160.

Then, after a waiting period for ten seconds in Step S702, a random number concerning an appearance frequency is generated in Step S703. Thereafter, in Step S704, it is determined whether the generated random number is included in the obstruction appearance numbers or not. If it is determined that the generated random number is not included in the obstruction appearance numbers, the processes of the Steps S702 thorough S704 are repeated.

If it is determined that the random number is included in the obstruction appearance numbers, the control goes to Step S705 for generating another random number concerning an obstructive character to be displayed on the monitor screen 160.

In Step S706, it is determined whether the obstructive character indicated by the random number is a special guest or not. If the obstructive character is not a special guest, the control goes to Step S707 for displaying an obstructive character on the monitor screen 160 based on the random number. In this case, an obstruction panel similar to the order panel 176 is displayed in the order area 174. When the player selects the obstruction panel, an object indicative of the obstructive character is displayed.

Figure 30:
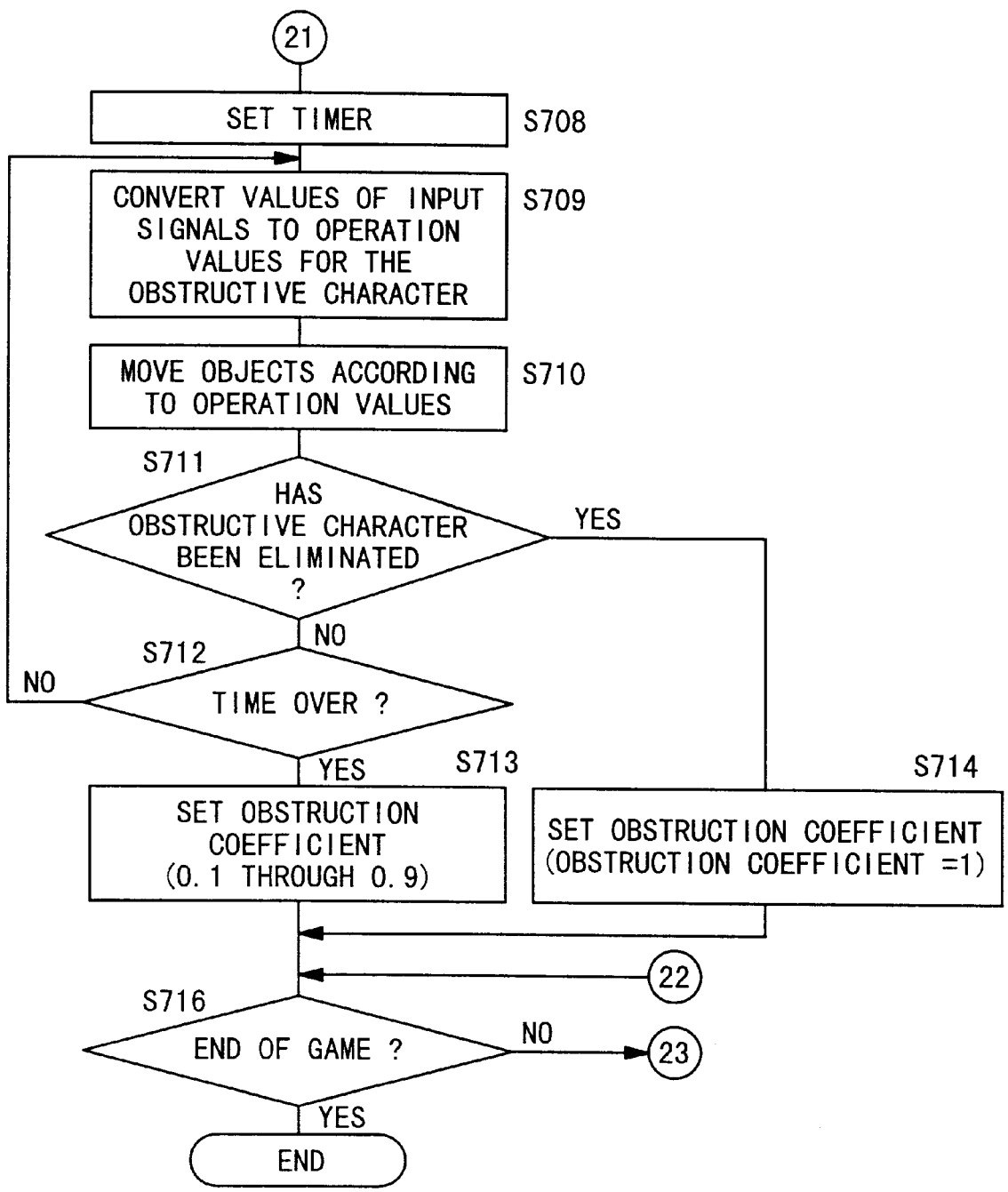
FIG. 30 is a flow chart (No. 2) showing a processing sequence of the progress obstructing means.

Next, in Step 708 in FIG. 30, a timer is set. Thereafter, in Step S709, values of the input signals from the left and right swivel control members 44 and 46 (vertical values Lv and horizontal values Lh) are converted into operation values of control element required for attending to or eliminating an obstructive character (for example, value for degree of leaning). Then, the control goes to Step S710.

In Step S710, objects displayed on the monitor screen 160 are moved in accordance with the operation values. For example, in the case of "eat and run", the player needs to alternately move the left and right swivel control members 44 and 46 upwardly and downwardly for running after the criminal person. This situation is presented on the monitor screen 160, which is ended when the main character catches up with the criminal person. In the case of "cockroach", the player needs to manipulate the left swivel control member 44 for moving an image of a slipper and manipulating the right swivel control member 46 for spanking cockroaches with the slipper. All the cockroaches should be eradicated for escaping from this situation.

In Step 711, it is determined that whether the obstructive character has been eliminated or not (if the obstructive character indicates cockroaches, it is determined whether all the cockroaches have been eliminated or not). If it is determined that the obstructive character has not been eliminated, then the control goes to Step S712 for determining whether a predetermined time has been passed or not. If the predetermined time has not been passed, the processes of Step S709 and the subsequent steps are repeated.

If it is determined that the obstructive character has not been eliminated in-Step S711 and the predetermined time has been passed in Step S712, the control goes to Step S713. In Step S713, an obstruction coefficient (0.1, 0.2, 0.3, . . . , 0.9) are stored in the record of the order file.

If it is determined that all of the obstructive characters have been eliminated in Step S711, then the control goes to Step S714. In Step S714, obstructive coefficient "1" is stored in the record of the order file.

Figure 29:
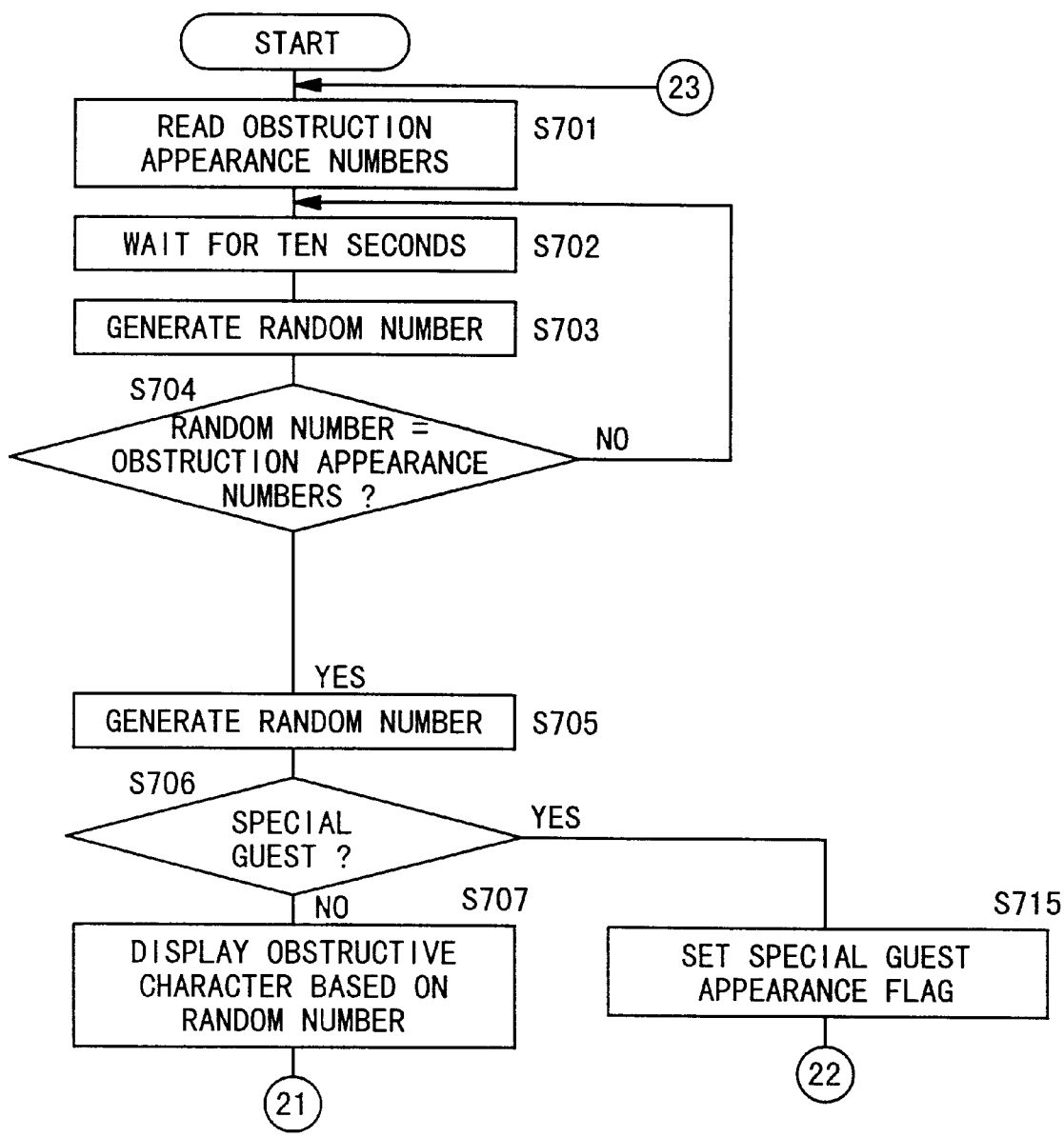
FIG. 29 is a flow chart (No. 1) showing a processing sequence of progress obstructing means.

In Step of S706 in FIG. 29, if it is determined that obstructive character is a special guest, the control goes to Step S715. In Step S715, the value of the special guest appearance flag is set, e.g., to "1". Then, after the process of Step S713 or Step S714, or after the process of Step S715, the control goes to Step S716 in FIG. 30. In Step S716, it is determined whether the game has been ended or not. If it is determined that the game has not been ended, the control goes back to Step S701 and processes for another obstructive character are performed. If it is determined that the game has been ended, the process of the process obstructing means 316 is brought to and end.

Next, the evaluation processing means 314 will be explained with reference to flow charts in FIGS. 31 and 32.

Figure 31:
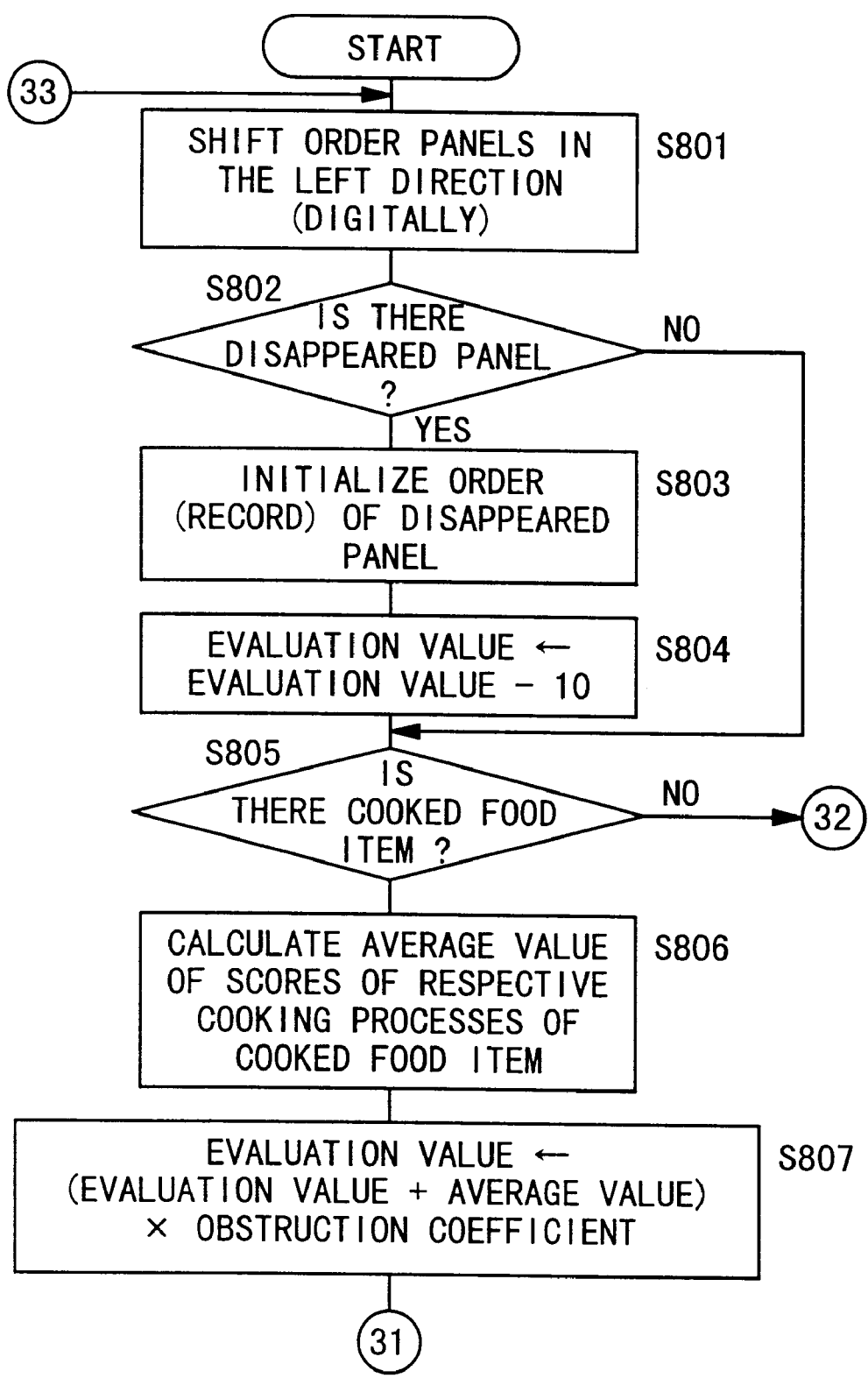
FIG. 31 is a flow chart (No. 1) showing a processing sequence of evaluation processing means.

In Step S801 of FIG. 31, the evaluation processing means 314 moves the order panels 176 (including the obstruction panel) slowly in the left direction, which is shown in the order area 174 on the monitor screen 160. This process is performed by shifting the display position of the order panels 176 digitally. For example, the order panels 176 are shifted by one pixel in the left direction every second.

Next in Step 802, it is determined that whether any of the order panels has been disappeared from the order area 174 or not (when the left end of the order panel 176 reaches the right end of the order area 174, the order panel 176 disappears from the order area 174 in the left direction). If it is determined that one of the order panels 176 is disappeared from the order area 174, the control goes to Step S803. In Step S803, the evaluation processing means 314 initializes the record corresponding to the disappeared order panel 176, in the order file. Thereafter, in Step S804, the evaluation processing means 314 subtracts a predetermined score (for example, 10) from the previous evaluation value to generate the current evaluation value.

When the process in Step 804 is finished, or when it is determined that no order panel 176 has disappeared from the order area 174, the control goes to Step S805 for determining whether any of the food items has been cooked or not.

If it is determined cooking of a food item has been finished, the control goes to Step S806. In Step S806, the evaluation values of respective cooking processes of the food item are averaged. Specifically, in the order file, the scores of the respective cooking processes stored in the record of the cooked food item are read and the read scores are averaged to generate an average value.

Next, in Step S807, the evaluation value is calculated based on the average value of the cooked food item. The calculation may be made by adding the average value to the current evaluation value to generate an added value and multiplying the added value by the obstruction coefficient.

Figure 32:
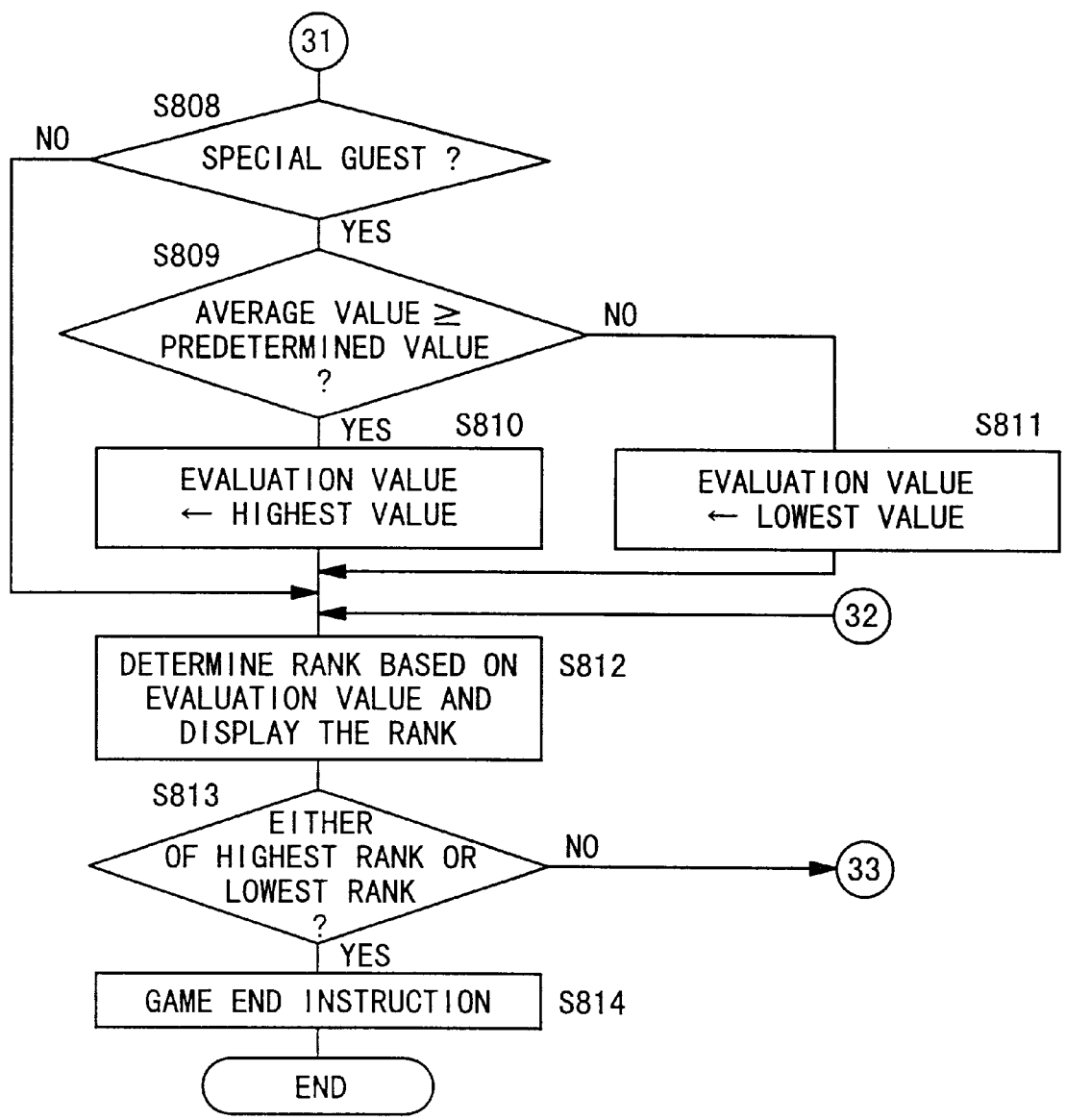
FIG. 32 is a flow chart (No. 2) showing a processing sequence of the evaluation processing means.

Next, in Step S808 of FIG. 32, it is determined whether the cooked food item is for the special guest or not. If it is determined that the cooked food item is for the special guest, the control goes to Step S809 for determining whether the average value of the present scores of the cooked food item for the special guest is not less than the predetermined value or not. If it is determined that the average value is not less than a predetermined value, the current evaluation value is updated to the highest value. If it is determined that the average value is less than the predetermined value, the current evaluation value is updated to the lowest value.

Then, when the process of Steps S810 or S811 is finished, or when it is determined that the random number is not for the special guest in Step S808, or if it is determined that no food item has been cooked in Step S805, the control goes to Step S812. In Step S812, a rank is determined from ten levels of ranks based on the calculated evaluation value. Then, the determined rank is displayed on the meter 162 on right side of the monitor screen 160. That is, the green belt 164 moves up or down on the meter 162 based on the determined rank.

Then, in Step 813, it is determined whether the determined rank is either of the highest rank or the lowest rank. If it is determined that the rank is neither the highest rank nor the lowest rank, the control goes back to Step S801 for evaluating the rank of the restaurant based on the rank of the cooked food item or the like. If it is determined that the rank is either of the highest rank or the lowest rank, the control goes to Step 814. In Step 814, a game end instruction is generated and the evaluation processing means 314 is brought to an end.

The routine in FIG. 20 will be explained again from Step S109. In Step 109, the end of the game is awaited. When the game is ended, the control goes to Step S110 in FIG. 21 for determining whether the rank of the restaurant is the highest rank or not. When it is determined that the rank of the restaurant is the highest rank, the control goes to Step S111 and the subsequent steps for executing a match game between the player and the chef of the restaurant.

In Step S111, the cooking process progressing means 312 is executed for the player, then in Step S112, the evaluation processing means 314 is executed for the player. Thereafter, In Step S113, the cooking process progressing means 312 is executed for the chef, then in Step S114, the evaluation processing means 314 is executed for the chef.

The cooking process progressing means 312 and the evaluation processing means 314 are executed for the chef based on predetermined parameter. The parameter is determined by the level of the chef. If the level is high, the rank of the chef's restaurant reaches the highest rank comparatively faster. If the level is low, the rank of the chef's restaurant reaches the highest rank comparatively slower.

If the player's restaurant reaches the highest rank faster than the chef's restaurant, the player wins the match game.

As shown in FIG. 27, in the match game, the cooking process progressing means 312 executes processes in Steps S520 and S521 (indicated by steps in square brackets) in addition to Steps S501 through S510. That is, if it is determined that the player finishes cooking of two or more dishes of the same food item at the same time in Step S520, the progress obstructing means 316 is executed against the other player so as to send an obstructive character to the other player's side. Thus, the development of the game becomes likely to be unpredictable.

Figure 21:
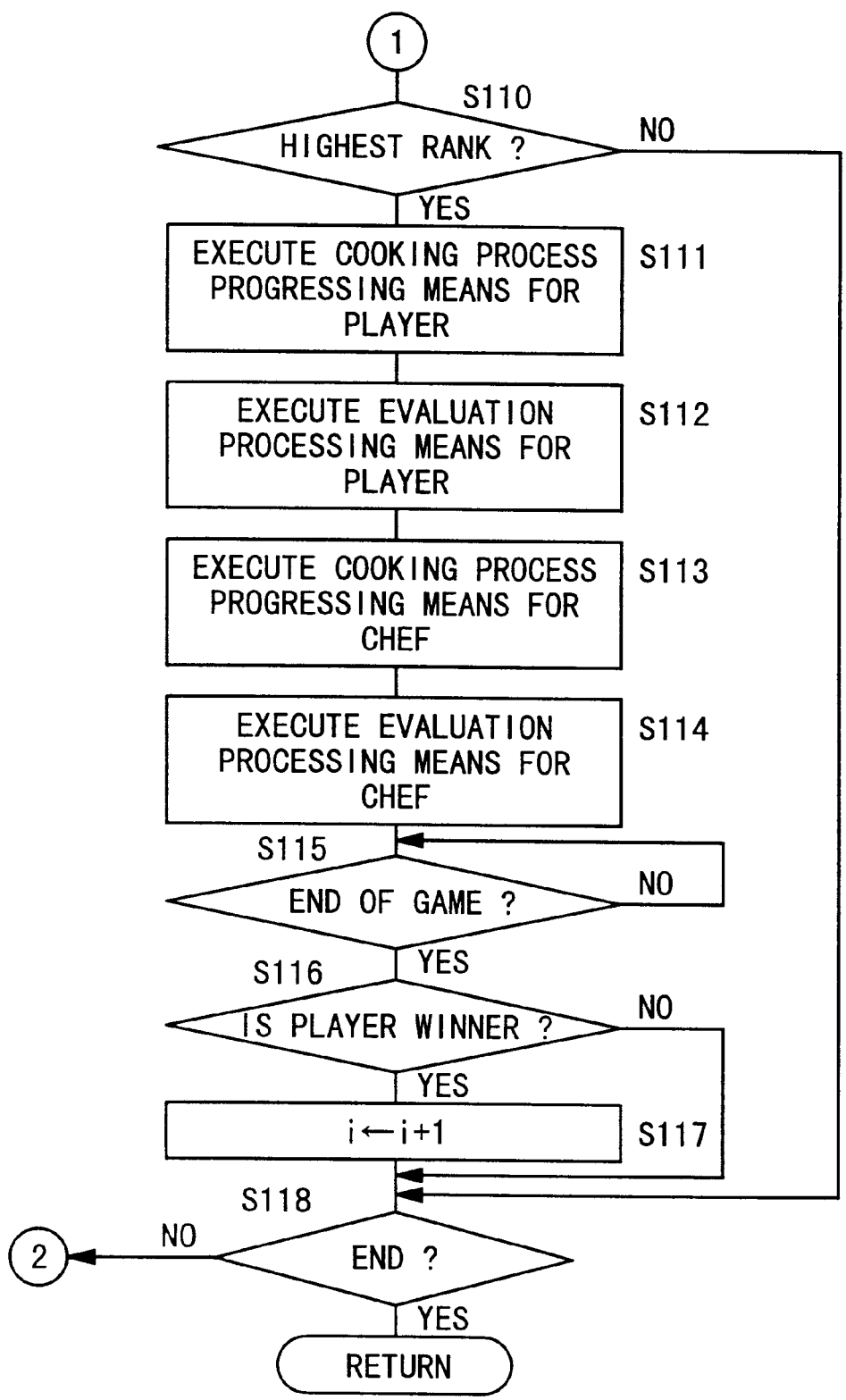
FIG. 21 is a flow chart (No. 2) showing a processing sequence of the story developing means.

Then, in Step S115 of FIG. 21, the end of the game is awaited. If it is determined that the game is ended, the control goes to Step S116 for determining the winner of the game. If the player's restaurant reaches the highest rank faster than the chef's restaurant, it is determined that the player is the winner.

If the player won the game, the control goes to Step S117 for updating the value of the index register i to be incremented by 1.

When the process of Step S117 is finished, or if it is determined that the player lost the game in Step S116, or if it is determined that the player's restaurant is not the highest rank in Step S110, the control goes to Step S118 for determining whether there is a request for ending the story developing means 302 or not.

If it is determined that there is no request for ending the story developing means 302, the control goes back to Step S102. Thus, the story for the next restaurant begins. If the player lost the game, the story for the same game begins again. If it is determined that there is a request for ending the story developing means 302, the process of the story developing means 302 is brought to an end.

Next, the competition processing means 306 will be described with reference to a flow chart in FIG. 33.

Figure 33:
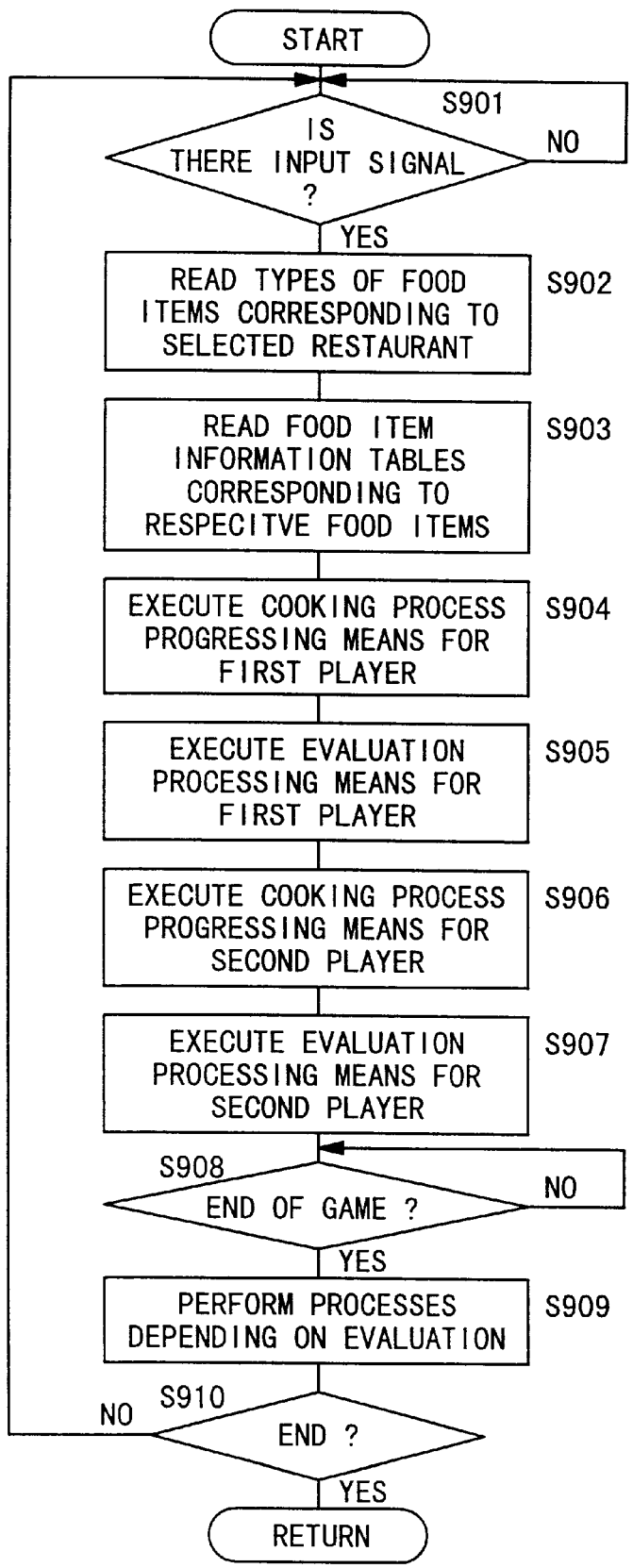
FIG. 33 is a flow chart showing a processing sequence of competition processing means.

In Step S901 of FIG. 33, the process of the competition processing means 306 is awaited until a restaurant is selected by the manual controller .16. When a restaurant is selected, the control goes to Step S902 for reading the types of food items corresponding to the selected restaurant from the optical disk 20. At this time, the number of food items M is determined.

Next, in Step S903, cooking information tables corresponding to the respective food items are read from the optical disk 20.

Thereafter, the control goes to Step S904 and the subsequent steps for loading a competition game for two players. In Step S904, the cooking process progressing means 312 is executed for a first player, then, in Step S905, the evaluation processing means 314 is executed for the first player. Thereafter, in Step S906, the cooking process progressing means 312 is executed for a second player, then, in Step S907, the evaluation processing means 314 is executed.

As shown in FIG. 27, in the competition mode, the cooking process progressing means 312 executes processes in Steps S520 and S521 (indicated by steps in square brackets) in addition to Steps S501 through S510. That is, if it is determined that the player finishes cooking of two or more dishes of the same food item at the same time in Step S520, the progress obstructing means 316 is executed against the other player so as to send an obstructive character to the other player's side.

Then, in Step S908 of FIG. 33, the end of the game is awaited. If it is determined that the game is ended, the control goes to Step S909 for performing the processes depending on the evaluation of the game, that is, ranking registration, or the like.

Then, in Step S910, it is determined whether there is a request for ending the competition processing means 306 or not. If it is determined that there is no request for ending the competition processing means 306, the control goes back to Step S901 for starting another match game. If there is a request for ending the competition processing means 306, the process of the competition processing means 306 is brought to an end.

Next, the three-minute cooking processing means 304 will be described with reference to FIG. 34.

Figure 34:
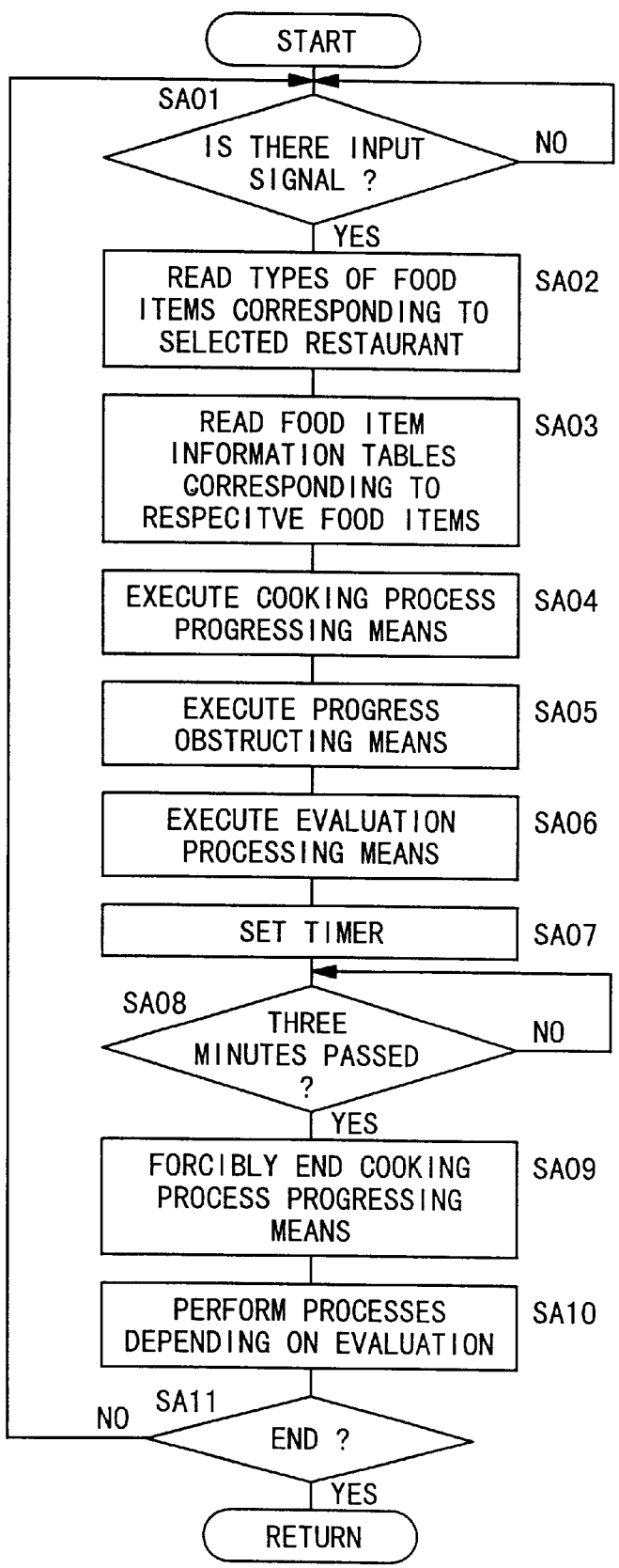
FIG. 34 is a flow chart showing a processing sequence of three-minute cooking processing means.

In Step SA01 in FIG. 34, the process of the three-minute cooking processing means 304 is awaited until a restaurant is selected by the manual controller 16. When a restaurant is selected, the control goes to Step SA02 for reading the type of the food items corresponding to the selected restaurant from the optical disk 20. At this time, the number of food items M is determined.

Next, in Step SA03, cooking information tables corresponding to the respective food items are read from the optical disk 20.

Thereafter, the control goes to Step SA04 and the subsequent steps for loading a game of the three-minute cooking mode. In Step SA04, the cooking process progressing means 312 is executed, then in Step SA05, the progress obstructing means 316 is executed. Thereafter, in Step SA06, the evaluation processing means 314 is executed.

Next, after a timer is set in Step SA07, time is counted for three minutes in Step SA08. Then, the control goes to Step SA09 for forcibly ending the cooking process progressing means 312. Then, in Step SA10, the processes depending on the evaluation of the restaurant (score of the game) are performed. For example, stars are displayed on the screen monitor 160 (stars indicate the rank of the restaurant, that is, the number of the stars corresponds to the rank of the restaurant).

Next, in Step SA11, it is determined whether there is a request for ending the three-minute cooking processing means 304 or not. If it is determined that there is no request for ending the three-minute cooking processing means 304, the control goes back to Step SAO1 for starting another three-minute cooking process. If there is a request for ending the three-minute cooking processing means 304, the process of the three-minute cooking processing means 304 is brought to an end.

As described above, according to the scenario progressing means 300 of the present embodiment, a cooking scenario displayed on the display monitor 18 can be progressed in response to instructions (input signals) from the manual controller 16. In this manner, a player can virtually experience a cooking operation easily and pleasantly, wherein appearance and/or taste of food is greatly affected by slight power adjustment by fingers or slight heat adjustment.

In particular, according to the present embodiment, since the scenario progressing means 300 includes the cooking guidance processing means 308 for introducing food items registered with the restaurant information table, the tutorial for the cooking method (the way of manipulating the manual controller 16) for each of the food items can be given for the player. Accordingly, it is convenient when the player forgets the cooking method, or when the player tries to play the game for the first time.

Further, since the scenario progressing means 300 includes the cooking trial processing means 310 for allowing the player to perform a cooking trial of the food items registered with the restaurant information table, the player can virtually experience the cooking method (the way of manipulating the manual controller 16). Accordingly, it is possible for the player to smoothly memorize the cooking method (manipulating method).

Further, since the scenario progressing means includes the story developing means 302 for allowing the player to virtually experience a cooking operation in a kitchen of a restaurant registered with the restaurant information table from opening time to closing time, the player can enjoy a game for competing the speed for smoothly serving delicious food for many guests in the restaurant. Accordingly, it is possible to provide an amusing and interesting game which has not been available before.

Further, since the scenario progressing means 300 includes the three-minute cooking processing means 304 for allowing the player to virtually experience a cooking operation in a kitchen of the restaurant registered with the restaurant information table for a predetermined time period (for example, three minutes), the player can enjoy a game for competing the speed of raising the rank of the restaurant in a short time such as three minutes. Accordingly, it is possible to provide a game which is suitable for the player who wants to play the game only for a short period of time.

Further, since the scenario progressing means 300 includes the competition processing means 306 for allowing the player to virtually experience a cooking operation in a kitchen of a restaurant registered with the restaurant information table, while playing a match game with a plurality of other players, the player can virtually experience the cooking experience with the player's friends. Accordingly, a further amusing aspect is added to the game.

Further, since the scenario progressing means 300 includes the progress obstructing means 316 for obstructing the progress of the cooking, the smoothly progressing cooking process can be abruptly obstructed by an obstructive character, that is, the progress of the cooking process is interrupted by the obstructive character. Accordingly, the development of the game becomes unpredictable, thereby adding a further amusing aspect to the game.

The entertainment system and the recording medium shall not be limited to the particular embodiment disclosed herein. It will be apparent to a person skilled in the art that numerous modifications and variation may be made without departing from the spirit and scope of the invention.

What is claimed is:

1. An entertainment system comprising:
   an entertainment apparatus for executing various programs;
   at least one manual controller having at least one analog control element for inputting a manual control request of a user to said entertainment apparatus as an instruction;

a display monitor for displaying images outputted by said entertainment apparatus; and scenario progressing means for progressing a cooking scenario of a simulation game displayed on said display monitor in accordance with said instruction from said manual controller;

wherein said scenario processing means displays an animation of cooking utensils on said display monitor, such that said cooking utensils are moved in accordance with signals from said manual controller inputted using said analog control element.

2. An entertainment system according to claim 1, wherein said scenario progressing means comprises cooking guidance processing means for providing an introduction of a food item registered with an information table.

3. An entertainment system according to claim 1, wherein said scenario progressing means comprises cooking trial processing means for allowing said user to perform a trial for cooking a food item registered with an information table.

4. An entertainment system according to claim 1, wherein said scenario progressing means comprises first virtual experience processing means for allowing said user to virtually experience a cooking operation in a kitchen of a restaurant registered with an information table from opening time to closing time of said restaurant.

5. An entertainment system according to claim 1, wherein said scenario progressing means comprises second virtual experience processing means for allowing said user to virtually experience a cooking operation in a kitchen of a restaurant registered with an information table for a predetermined time period.

6. An entertainment system.according to claim 1, wherein said scenario progressing means comprises third virtual experience processing means for allowing said user to virtually experience a cooking operation in a kitchen of a restaurant registered with an information table, while playing a match game with a plurality of other users.

7. An entertainment system according to claim 1, wherein said scenario progressing means further comprises cooking process progressing means for progressing a cooking process based on manual control data inputted from said manual controller.

8. An entertainment system according to claim 1, wherein said scenario progressing means further comprises evaluation processing means for evaluating status of cooking progress.

9. An entertainment system according to claim 1, wherein said scenario progressing means further comprises progress obstructing means for obstructing cooking progress.

10. An entertainment apparatus connectable to at least one manual controller having at least one analog control element for outputting a manual control request of a user to said entertainment apparatus as an instruction, and to a display monitor for displaying images outputted by said entertainment apparatus, said entertainment apparatus comprising:

scenario progressing means for progressing a cooking scenario of a simulation game displayed on said display monitor in accordance with said instruction from said manual controller; and means for outputting images to said display monitor;

wherein said scenario progressing means displays an animation of cooking utensils on said display monitor, such that said cooking utensils are moved in accordance with signals from said manual controller inputted using said analog control element.

11. A recording medium for storing a program and data for use in an entertainment system, said entertainment system comprising:

an entertainment apparatus for executing various programs;

at least one manual controller having at least one analog control element for inputting a manual control request of a user to said entertainment apparatus as an instruction; and a display monitor for displaying images outputted by said entertainment apparatus;

wherein said program comprises scenario progressing means for progressing a cooking scenario of a simulation game displayed on said display monitor in accordance with said instruction from said manual controller; and wherein an animation of cooking utensils is displayed on said monitor such that said cooking utensils are moved in accordance with signals from said manual controller inputted using said analog control element.

12. A recording medium according to claim 11, wherein said scenario progressing step comprises cooking guidance processing step for providing an introduction of a food item registered with an information table.

13. A recording medium according to claim 11, wherein said scenario progressing step comprises cooking trial processing step for allowing said user to perform a trial for cooking a food item registered with an information table.

14. A recording medium according to claim 11, wherein said scenario progressing step comprises first virtual experience processing step for allowing said user to virtually experience a cooking operation in a kitchen of a restaurant registered with an information table from opening time to closing time of said restaurant.

15. A recording medium according to claim 11, wherein said scenario progressing step comprises second virtual experience processing step for allowing said user to virtually experience a cooking operation in a kitchen of a restaurant registered with an information table for a predetermined time period.

16. A recording medium according to claim 11, wherein said scenario progressing step comprises third virtual experience processing step for allowing said user to virtually experience a cooking operation in a kitchen of a restaurant registered with an information table, while playing a match game with a plurality of other users.

17. A recording medium according to claim 11, wherein said scenario progressing step further comprises cooking process progressing step for progressing a cooking process based on manual control data inputted from said manual controller.

18. A recording medium according to claim 11, wherein said scenario progressing step further comprises evaluation processing step for evaluating status of cooking progress.

19. A recording medium according to claim 11, wherein said scenario progressing step further comprises progress obstructing step for obstructing cooking progress.

20. A program readable and executable by a computer, said program being for use in an entertainment system comprising:

an entertainment apparatus for executing various programs;

at least one manual controller having at least one analog control element for inputting a manual control request of a user to said entertainment apparatus as an instruction; and a display monitor for displaying images outputted by said entertainment apparatus;

wherein said program comprises:
scenario progressing means for progressing a cooking scenario of a simulation game displayed on said display monitor in accordance with said instruction from said manual controller; and
means for causing said entertainment apparatus to output images to said display monitor,
wherein an animation of cooking utensils is displayed on said monitor such that said cooking utensils are moved in accordance with signals from said manual controller inputted using said analog control element.

* * * * *

UNITED STATES PATENT AND TRADEMARK OFFICE
CERTIFICATE OF CORRECTION

PATENT NO.     : 6,482,091 B1
DATED          : November 19, 2002
INVENTOR(S)    : Takaki Kobayashi et al.

It is certified that error appears in the above-identified patent and that said Letters Patent is hereby corrected as shown below:

<u>Title page,</u>
Item [73] Assignee, please change "Sony Computer Entertainment, Inc." to
-- Sony Computer Entertainment Inc. --.

Signed and Sealed this

Seventh Day of June, 2005

JON W. DUDAS
*Director of the United States Patent and Trademark Office*